(12) United States Patent
Luo et al.

(10) Patent No.: US 10,439,786 B2
(45) Date of Patent: Oct. 8, 2019

(54) METHODS OF RESOLVING PDCCH CONFUSION IN LTE

(75) Inventors: Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/023,311

(22) Filed: Feb. 8, 2011

(65) Prior Publication Data

US 2011/0228732 A1 Sep. 22, 2011

Related U.S. Application Data

(60) Provisional application No. 61/315,367, filed on Mar. 18, 2010, provisional application No. 61/384,613, filed on Sep. 20, 2010.

(51) Int. Cl.
| | |
|---|---|
| *H04W 72/14* | (2009.01) |
| *H04L 29/08* | (2006.01) |
| *H04L 27/00* | (2006.01) |
| *H04W 72/04* | (2009.01) |
| *H04L 5/00* | (2006.01) |
| *H04L 1/00* | (2006.01) |

(52) U.S. Cl.
CPC .......... *H04L 5/0094* (2013.01); *H04L 1/0045* (2013.01); *H04L 5/001* (2013.01)

(58) Field of Classification Search
CPC .............. H04L 5/001; H04W 72/1278; H04W 72/1294; H04W 72/042
See application file for complete search history.

(56) References Cited

U.S. PATENT DOCUMENTS

| | | | |
|---|---|---|---|
| 7,848,346 B2 | 12/2010 | Park | |
| 7,881,236 B2 | 2/2011 | Park | |
| 8,780,841 B2* | 7/2014 | Earnshaw et al. | 370/329 |
| 2009/0257449 A1* | 10/2009 | Chen et al. | 370/470 |

(Continued)

FOREIGN PATENT DOCUMENTS

| | | |
|---|---|---|
| EP | 2536204 A1 | 12/2012 |
| JP | 2013522948 A | 6/2013 |

(Continued)

OTHER PUBLICATIONS

Huawei Remaining Issues on Carrier Indicator Field San Francisco Feb. 22-26, 2010.*

(Continued)

*Primary Examiner* — Asad M Nawaz
*Assistant Examiner* — Jason A Harley
(74) *Attorney, Agent, or Firm* — Patterson & Sheridan, LLP

(57) ABSTRACT

In a method of wireless communication, a UE receives a configuration to receive a CIF for a serving cell of a plurality of serving cells. In addition, the UE monitors a PDCCH on a primary cell of the plurality of serving cells. Said primary cell is different than said serving cell. Furthermore, the UE assumes information received in the PDCCH is for said primary cell when the received information has a common payload size and is in a common search space with a first CCE index in the common search space being equal to a first CCE index in a UE specific search space.

24 Claims, 29 Drawing Sheets

(56) References Cited

U.S. PATENT DOCUMENTS

| | | | |
|---|---|---|---|
| 2010/0050059 A1 | 2/2010 | Cheng | |
| 2010/0254268 A1* | 10/2010 | Kim | H04W 36/385 370/241 |
| 2010/0279628 A1* | 11/2010 | Love | H04L 5/0091 455/70 |
| 2010/0322173 A1 | 12/2010 | Marinier | |
| 2011/0064042 A1* | 3/2011 | Kim | H04L 5/0094 370/329 |
| 2011/0170420 A1* | 7/2011 | Xi et al. | 370/241 |
| 2011/0205978 A1* | 8/2011 | Nory | H04L 5/0007 370/329 |
| 2011/0243066 A1* | 10/2011 | Nayeb Nazar | H04L 1/007 370/328 |
| 2011/0243106 A1* | 10/2011 | Hsu et al. | 370/336 |
| 2011/0312326 A1* | 12/2011 | Kwon | H04W 36/0072 455/436 |
| 2012/0093112 A1 | 4/2012 | Qu et al. | |
| 2012/0320840 A1* | 12/2012 | Kim | H04L 5/001 370/329 |
| 2013/0010724 A1* | 1/2013 | Han | H04L 5/0007 370/329 |
| 2013/0070690 A1* | 3/2013 | Moon et al. | 370/329 |

FOREIGN PATENT DOCUMENTS

| | | |
|---|---|---|
| JP | 2013533649 A | 8/2013 |
| KR | 20100014091 A | 2/2010 |
| WO | 2010013959 A2 | 2/2010 |
| WO | 2010013970 A2 | 2/2010 |
| WO | WO 2010013970 A2 * | 2/2010 |
| WO | WO2010083741 | 7/2010 |
| WO | 2011065703 A2 | 6/2011 |
| WO | 2011098044 A1 | 8/2011 |
| WO | 2011112036 A2 | 9/2011 |

OTHER PUBLICATIONS

Huawei Remaining Issues on Carrier Indicator Field San Francisco Feb. 22-26, 2010 (Year: 2010).*

Huawei: "Remaining Issues on Carrier Indicator Field", 3GPP Draft; R1-101047 Remaining Issues on Carrier Indicator Field, 3rd Generation Partnership Project (3GPP), Mobile Competence Centre, Feb. 16, 2010 (Feb. 16, 2010), pp. 1-4, XP050418618, France [retrieved on Feb. 16, 2010].

International Search Report and Written Opinion—PCT/US2011/028742, ISA/EPO—dated Jul. 12, 2011.

Mediatek Inc: "Discussion of Carrier Indicator Field", 3GPP Draft; R1-101020, 3rd Generation Partnership Project (3GPP), Mobile Competence Centre, Feb. 16, 2010 (Feb. 16, 2010), pp. 1-2, XP050418594, France [retrieved on Feb. 16, 2010].

Panasonic: "Discussion on PDCCH with carrier indicator", 3GPP Draft; R1-094496, 3rd Generation Partnership Project (3GPP), Mobile Competence Centre, Nov. 9, 2009 (Nov. 9, 2009), pp. 1-3, XP050388917, France [retrieved on Nov. 2, 2009].

Samsung: "Configuration Aspects for Carrier Indicator Field", 3GPP Draft; R1-101139 CIF, 3rd Generation Partnership Project (3GPP), Mobile Competence Centre, Feb. 16, 2010 (Feb. 16, 2010), pp. 1-4, XP050418683, France [retrieved on Feb. 16, 2010].

Texas Instruments: "PDCCH Carrier Indication Field for Cross-Carrier Scheduling", 3GPP Draft; R1-094761 TI CI Usage, 3rd Generation Partnership Project (3GPP), Mobile Competence Centre, Nov. 9, 2009 (Nov. 9, 2009), pp 1-4, XP050389158, France [retrieved on Nov. 3, 2009].

QUALCOMM Incorporated: "Interpreting the Carrier Indicator Field", 3GPP TSG RAN WG1 #60 R1-101475, Feb. 26, 2010, p. 1-p. 3.

Taiwan Search Report—TW100109195—TIPO—dated Jun. 4, 2014.

LTE : "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 9)," 3GPP TS 36.300, Jan. 7, 2009, V9.2.0.

Ericsson, et al., "On Collision between Common and UE Specific Search Spaces", 3GPP Draft; R1-103505, 3rd Generation Partnership Project (3GPP), Mobile Competence Centre, 650, Route Des Lucioles, F-06921 Sophia-Antipolis Cedex, France, vol. RAN WG1, No. Dresden, Germany; Jun. 22, 2010, XP050449024, [retrieved on Jun. 22, 2010], 3 pages.

* cited by examiner

METHODS OF RESOLVING PDCCH CONFUSION IN LTE

CROSS-REFERENCE TO RELATED APPLICATION(S)

This application claims the benefit of U.S. Provisional Application Ser. No. 61/315,367, entitled "Methods of Resolving PDCCH Confusion in LTE-A" and filed on Mar. 18, 2010 and the benefit of U.S. Provisional Application Ser. No. 61/384,613, entitled "Methods of Resolving PDCCH Confusion in LTE-A" and filed on Sep. 20, 2010, both applications of which are expressly incorporated by reference herein in their entirety.

BACKGROUND

Field

The present disclosure relates generally to communication systems, and more particularly, to methods of resolving physical downlink control channel (PDCCH) confusion in Long Term Evolution (LTE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication in a base station are provided in which the base station configures a user equipment with a plurality of component carriers. In addition, the base station determines when the user equipment is unable to discern whether a carrier indicator field is included in a grant transmitted on a component carrier of the plurality of component carriers. Through the grant, only said component carrier is scheduled whenever the inability to discern is determined.

In an aspect of the disclosure, a method, an apparatus, and a computer program product for wireless communication are provided in which a grant is received on a component carrier of a plurality of component carriers. In addition, the apparatus communicates with an eNodeB based on the grant. The grant schedules only said component carrier when the apparatus would be unable to discern whether a carrier indicator field is included in a grant.

In an aspect of the disclosure, a method, an apparatus, and a computer program product for wireless communication in a base station are provided in which the base station configures a user equipment with a plurality of component carriers. In addition, the base station determines when the UE is unable to discern whether a carrier indicator field is included in a grant. Furthermore, the grant is modified in order to indicate to the user equipment whether the carrier indicator field is included in the grant when the user equipment is unable to discern whether the carrier indicator field is included in the grant.

In an aspect of the disclosure, a method, an apparatus, and a computer program product for wireless communication are provided in which downlink control information is received including a grant for one of a plurality of component carriers, the grant being modified in order to indicate whether a carrier indicator field is included when the UE is unable to discern whether the grant includes the carrier indicator field. In addition, whether the carrier indicator field is included in the grant is determined based on the modification to the grant.

In an aspect of the disclosure, a method, an apparatus, and a computer program product for wireless communication are provided in which a configuration to receive a carrier indicator field for a serving cell of a plurality of serving cells is received. In addition, a physical downlink control channel is monitored on a primary cell of the plurality of serving cells. Said primary cell is different than said serving cell. Furthermore, information received in the physical downlink control channel is assumed to be for said primary cell when the received information has a common payload size and is in a common search space with a first control channel element index in the common search space being equal to a first CCE index in a user equipment specific search space.

DETAILED DESCRIPTION

Figure 1:
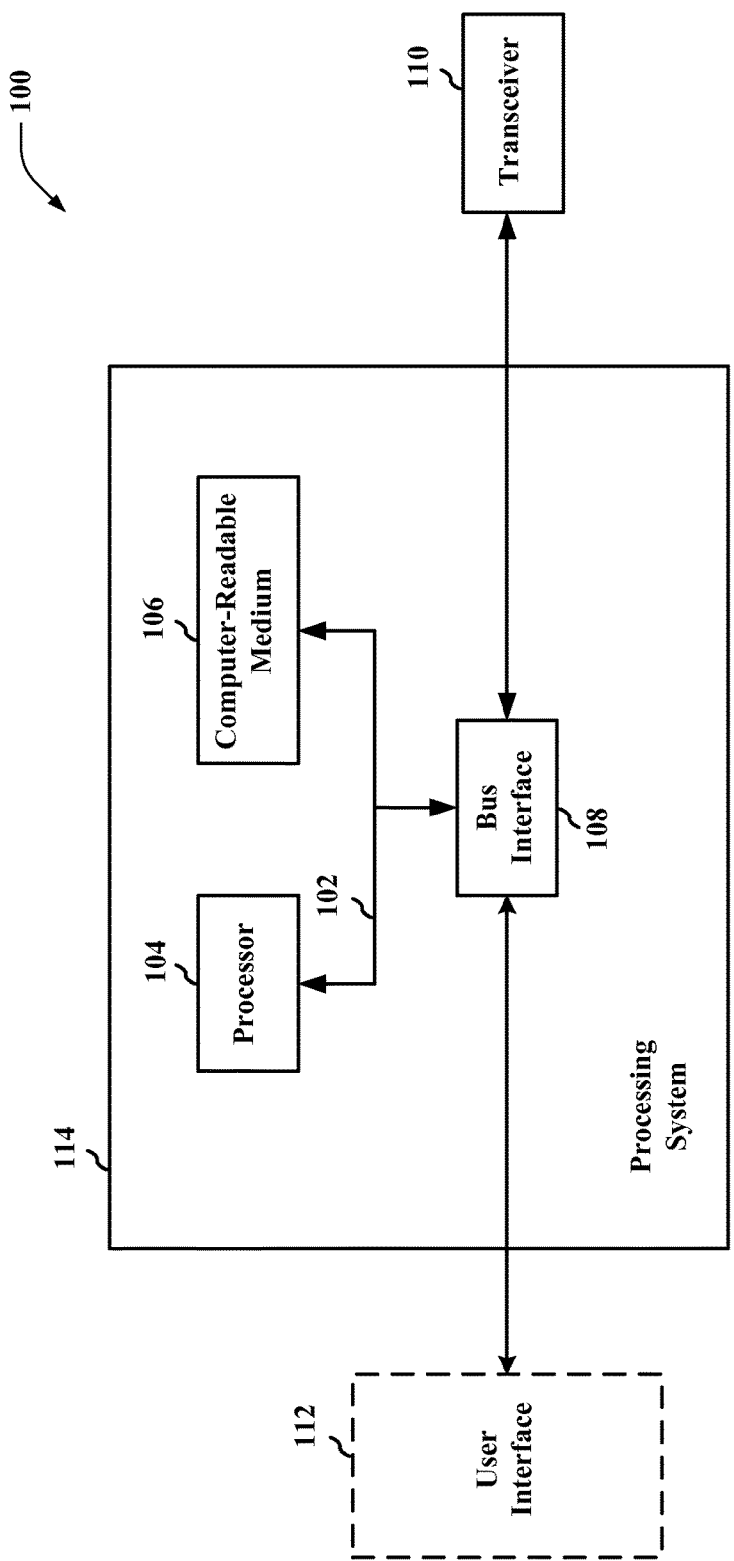
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
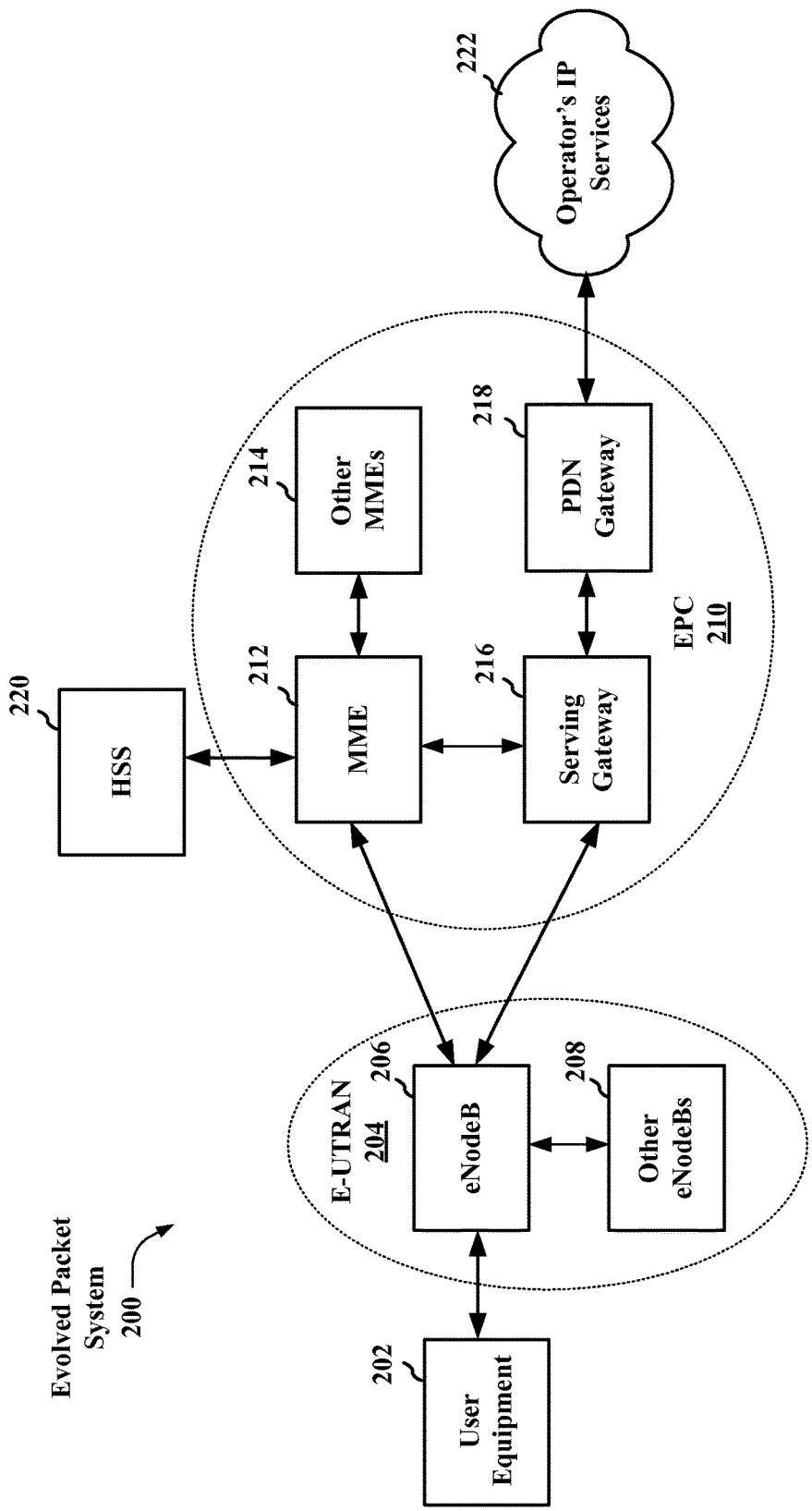
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
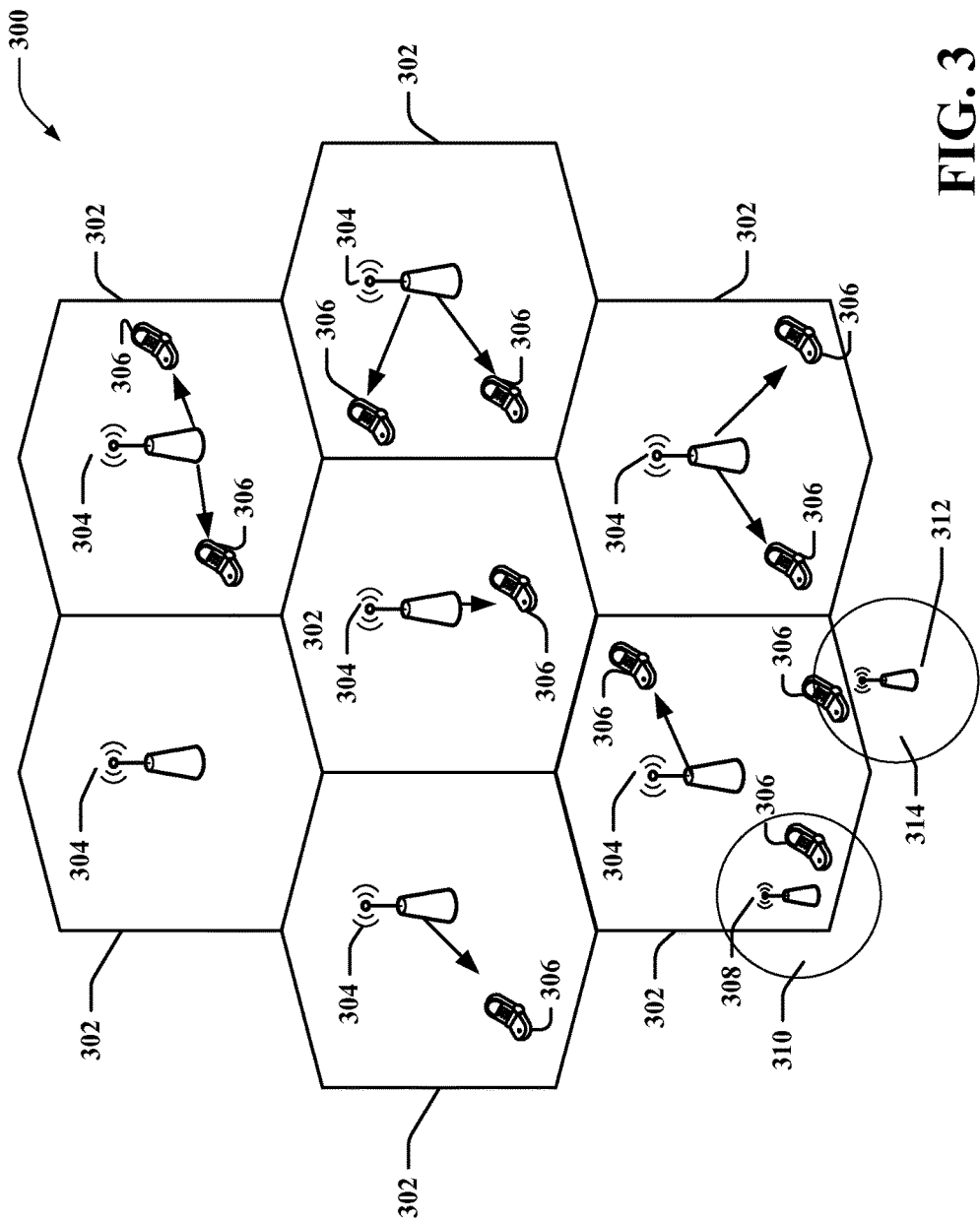
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
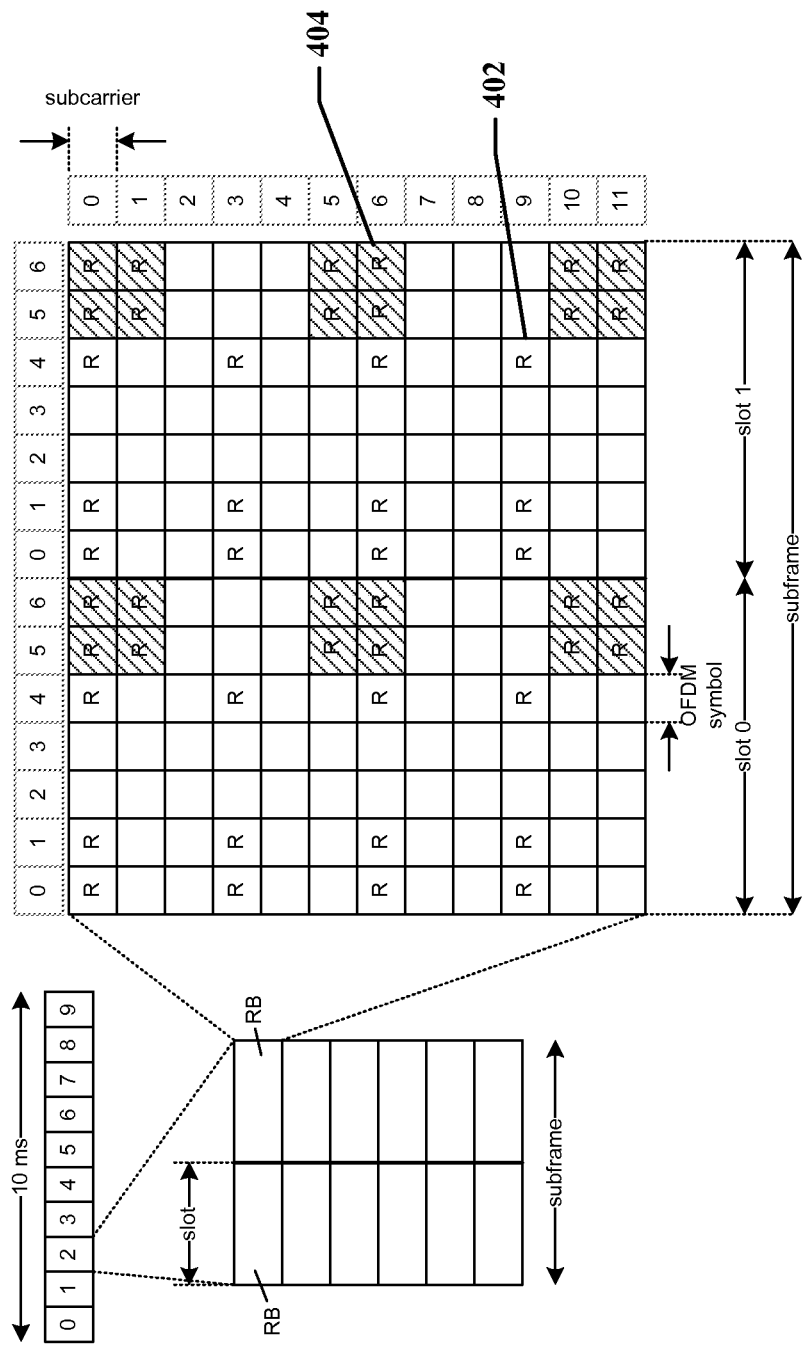
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
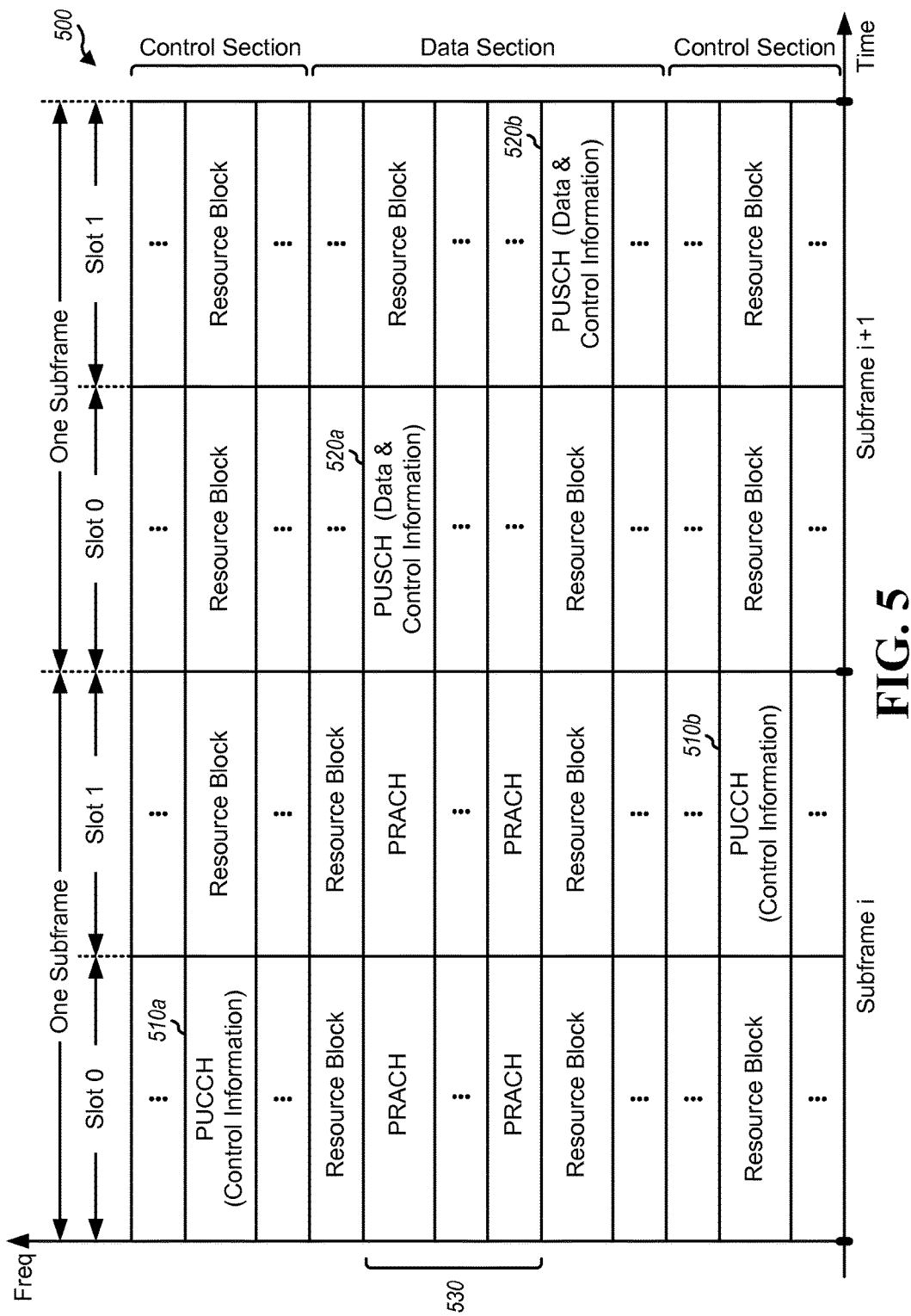
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
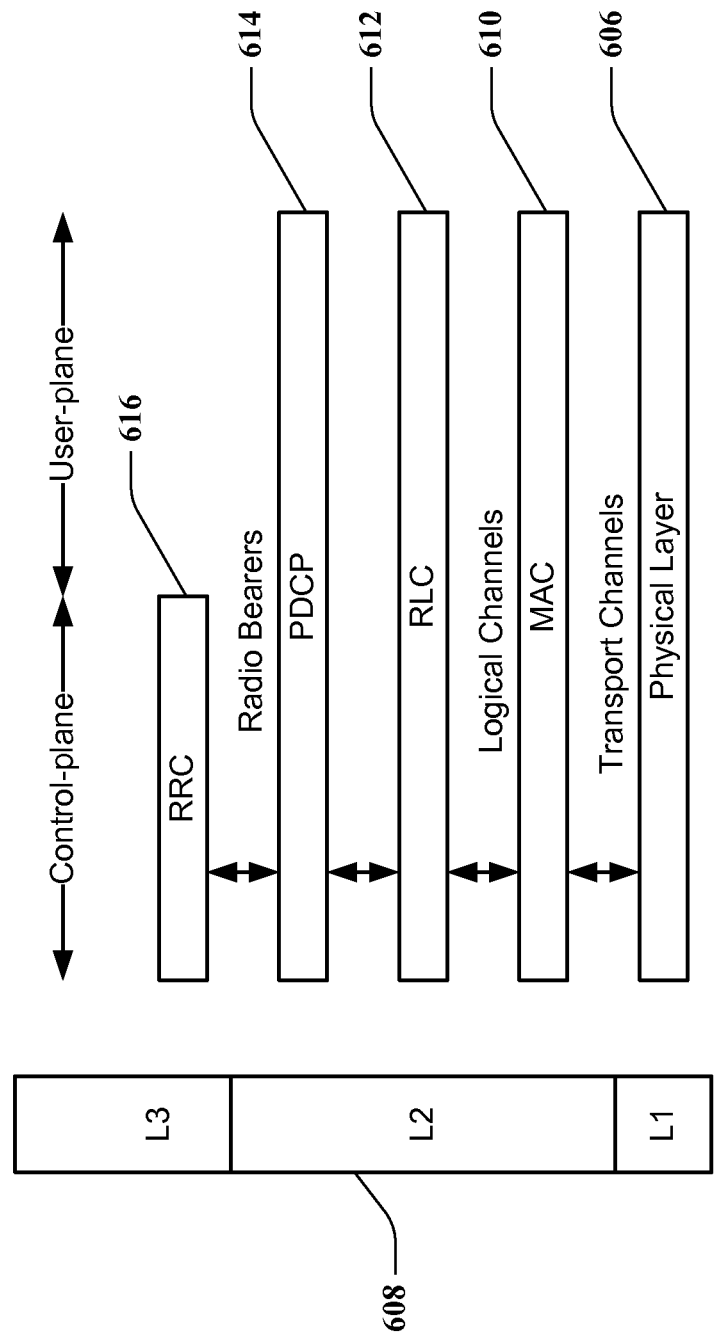
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks)

in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
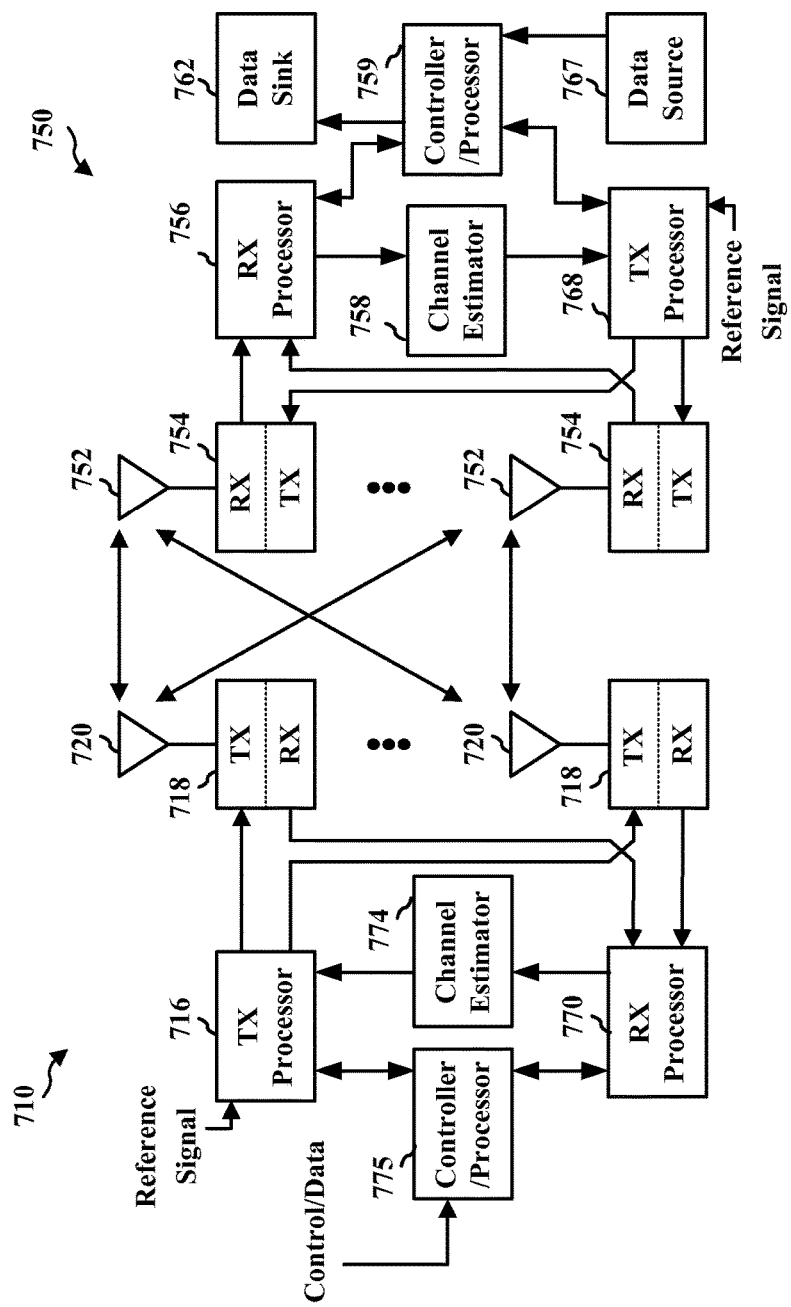
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

In one configuration, the processing system 114 described in relation to FIG. 1 includes the eNB 710. In particular, the processing system 114 includes the TX processor 716, the RX processor 770, and the controller/processor 775. In another configuration, the processing system 114 described in relation to FIG. 1 includes the UE 750. In particular, the processing system 114 includes the TX processor 768, the RX processor 756, and the controller/processor 759.

Figure 8:
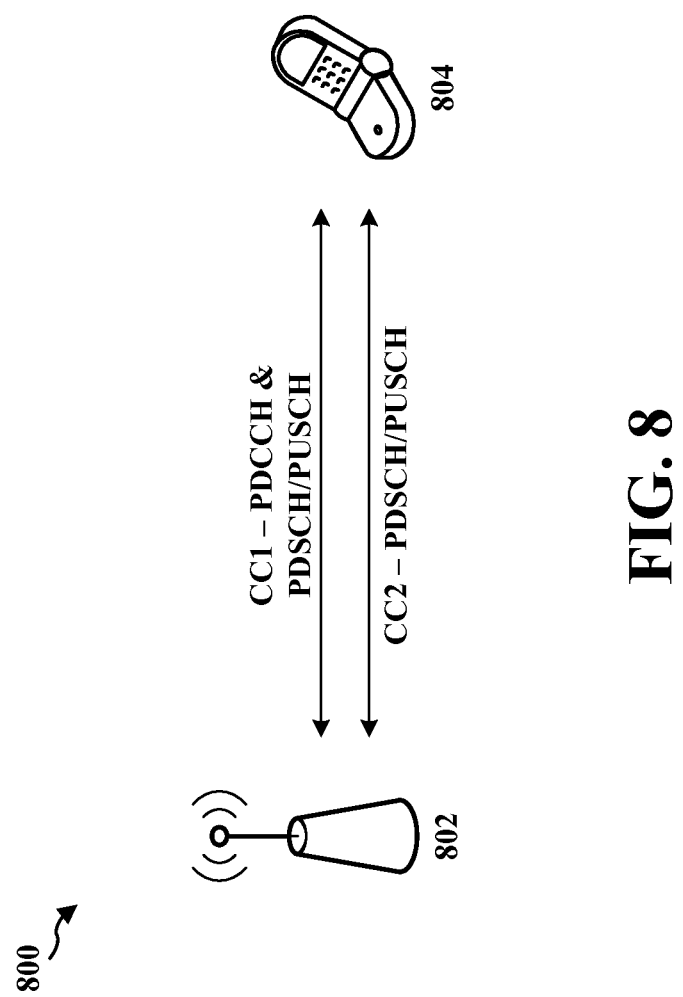
FIG. 8 is a diagram illustrating cross carrier scheduling.

FIG. 8 is a diagram 800 illustrating cross carrier scheduling. As shown in FIG. 8, the UE 804 communicates with the eNodeB 802 on multiple carriers (i.e., component carriers), including component carrier CC1 and component carrier CC2. Component carriers may also be referred to as serving cells of the eNodeB 802. As such, component carrier CC1 may be referred to as a serving cell and component carrier CC2 may be referred to as a serving cell. The eNodeB 802 transmits PDCCH on the component carrier CC1, but does not transmit PDCCH on the component carrier CC2. As such, the PDCCH transmitted on the component carrier CC1 carries scheduling information for both the component carrier CC1 and the component carrier CC2. Because the component carrier CC1 schedules itself, the component carrier CC1 may be a primary or an anchor carrier. The primary carrier or primary component carrier may also be referred to as a primary cell of the eNodeB 802. The scheduling information includes DL grants for traffic data to be received by the UE 804 on the physical downlink shared channel (PDSCH) and UL grants for traffic data to be sent by the UE 804 on the physical uplink shared channel (PUSCH). The information carried on the PDCCH is referred to as downlink control information (DCI). So that the UE 804 knows for which component carrier the PDCCH grant applies, the DCI may include a carrier indicator field (CIF). The CIF is currently three bits, and therefore cross carrier scheduling can support five component carriers, and theoretically can work with up to eight component carriers. However, in other examples, the CIF may have more or less than 3 bits.

The inclusion of the CIF in a DCI can be configured. For example, the DCI for component carrier CC1 may be configured not to include the CIF if the PDCCH is in the common search space. The DCI for both component carriers CC1 and CC2 may be configured to include the CIF if the PDCCH is in the UE specific search space. The configuration of the DCI to include the CIF for each of the component carriers is independent of whether the component carriers are using the same PDCCH format or different PDCCH formats. Because some DCI may contain the CIF and some may not, the UE looks at the PDCCH payload size to determine whether the DCI includes the CIF. The PDCCH payload size is a function of the transmission mode, the number of transmit antennas at the eNodeB 802 (DL-MIMO) and/or the number of transmit antennas at the UE (UL-MIMO), TDD and FDD systems, whether the DCI include the CIF, bandwidth, etc. As such, a PDCCH payload size without the CIF for the component carrier CC1 may be the same as that of another PDCCH with the CIF for the component carrier CC2. Since PDCCHs for both the component carriers CC1 and CC2 are transmitted on CC1 and CC2, the UE 804 may not be able to differentiate whether the PDCCH grant is for the component carrier CC1 (without the CIF) or the component carrier CC2 (with the CIF) based on the PDCCH payload size alone.

For example, if the eNodeB 802 transmits the component carrier CC1 with four transmit antennas, the eNodeB 802 transmits the component carrier CC2 with two transmit antennas, and the UE 804 is configured for transmission mode four for both the component carrier CC1 and the component carrier CC2, then the PDCCH grant for the component carrier CC1 without the CIF will be 62 bits and the PDCCH grant for the component carrier CC2 without the CIF will be 59 bits. If the PDCCH grant for the component carrier CC2 includes the CIF, the PDCCH grant for the component carrier CC2 will also be 62 bits, and therefore the UE 804 would not be able to distinguish for which component carrier the PDCCH grant applies based on the PDCCH payload size alone, as they are both equal to 62 bits.

Figure 9:
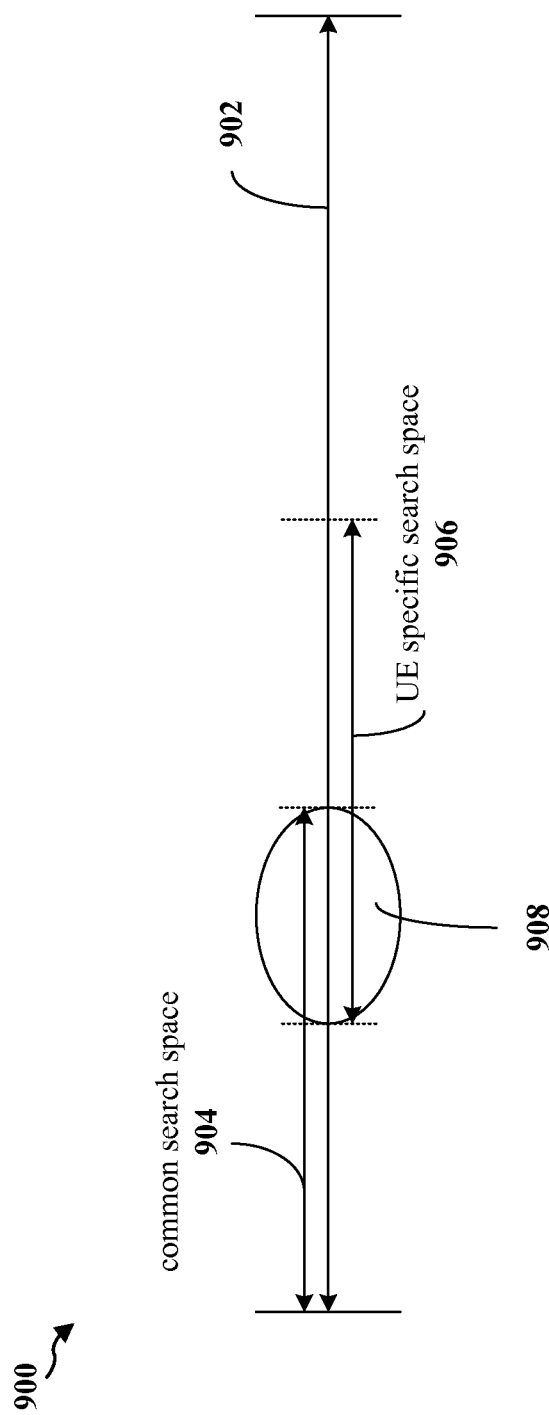
FIG. 9 is a first diagram for illustrating a potential PDCCH confusion when there is cross carrier scheduling.

FIG. 9 is a first diagram 900 for illustrating a potential PDCCH confusion when there is cross carrier scheduling. As discussed supra, ambiguity arises when the CIF is included in the PDCCH grant for some component carriers and not others while the PDCCH payload size is the same. The ambiguity is also due to the fact that the PDCCH payload may be located in an overlapping search space. Within the search space 902, the DCI may be located in a common search space 904 or in a UE specific search space 906. The common search space 904 overlaps with the UE specific search space 906 when a first control channel element (CCE) index $n_{CCE}$ of the common search space 904 is equal to a first CCE index $n_{CCE}$ of the UE specific search space 906. Each PDCCH is transmitted in one or more CCEs. Each CCE corresponds to nine sets of four physical resource elements known as Resource Element Groups (REGs). A plurality of symbols are mapped to each REG. The CCE index is the CCE number at which the control channel data are allocated. The set of CCE locations in which the UE may find its PDCCHs can be considered as a search space. The search space size differs based on PDCCH format. The UE specific search space 906 is a dedicated search space configured for each UE individually, whereas the common search space 904 is configured for all UEs.

The PDCCH may be broadcast or unicast. When the PDCCH is broadcast, the PDCCH must be transmitted in the common search space 904. When the PDCCH is unicast, the PDCCH may be transmitted in the common search space 904 or in the UE specific search space 906. As shown in FIG. 9, the search spaces 904, 906 could potentially overlap. When the search spaces 904, 906 overlap (i.e., same first CCE index $n_{CCE}$ in the common search space 904 and the UE specific search space 906), the PDCCH payload is in the overlapped space 908, and the PDCCH payload for the component carrier CC1 without a CIF is the same size as the PDCCH payload for the component carrier CC2 with a CIF, the UE 804 may not be able to determine for which component carrier the PDCCH applies.

Figure 10:
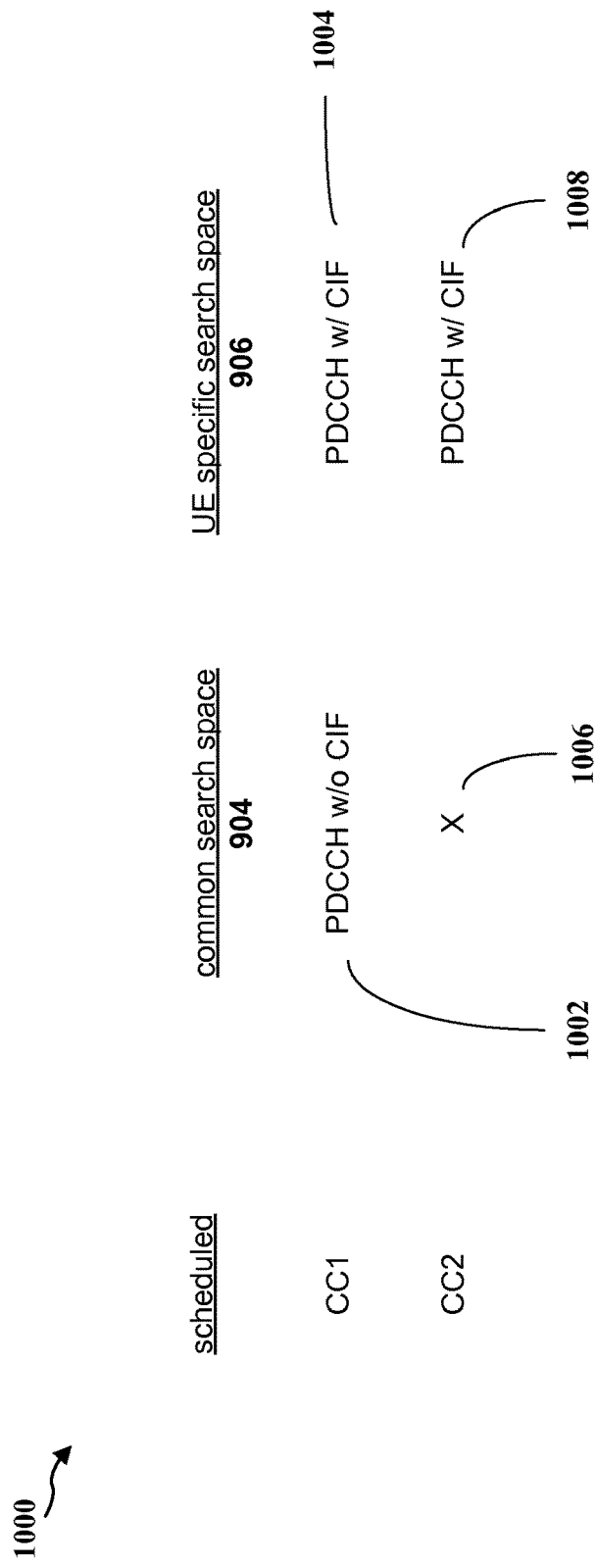
FIG. 10 is a second diagram for illustrating a potential PDCCH confusion when there is cross carrier scheduling.

FIG. 10 is a second diagram 1000 for illustrating a potential PDCCH confusion when there is cross carrier scheduling. As shown in FIG. 10, the PDCCH for component carrier CC1 may be in the common search space 904 or the UE specific search space 906. When the PDCCH for component carrier CC1 is in the common search space 904, the PDCCH does not include the CIF (1002) in order to maintain backward compatibility with earlier LTE releases. Theoretically, PDCCH transmitted in the common search space 904 may include the CIF for unicast and not for broadcast, but the common search space 904 would increase in size and a number of blind decodes would increase. As such, PDCCH transmitted in the common search space 904 does not include the CIF.

When the PDCCH for the component carrier CC1 is in the UE specific search space 906, the PDCCH may include the CIF (1004). The PDCCH for component carrier CC2 is not in the common search space 904 (1006) and is in the UE specific search space 906 only (1008). The UE 804 is able to determine for which component carrier the PDCCH applies with respect to PDCCH scheduling possibilities 1004, 1008, as the UE 804 would know that both include a CIF and therefore would assume a CIF is included in the DCI and look at the CIF to determine which of the component carriers is being scheduled. However, with respect to PDCCH scheduling possibilities 1002, 1008, the UE 804 may not be able to determine for which component carrier the PDCCH applies when the PDCCH payload size is the same and the PDCCH payload is in the overlapping search space 908.

Figure 11:
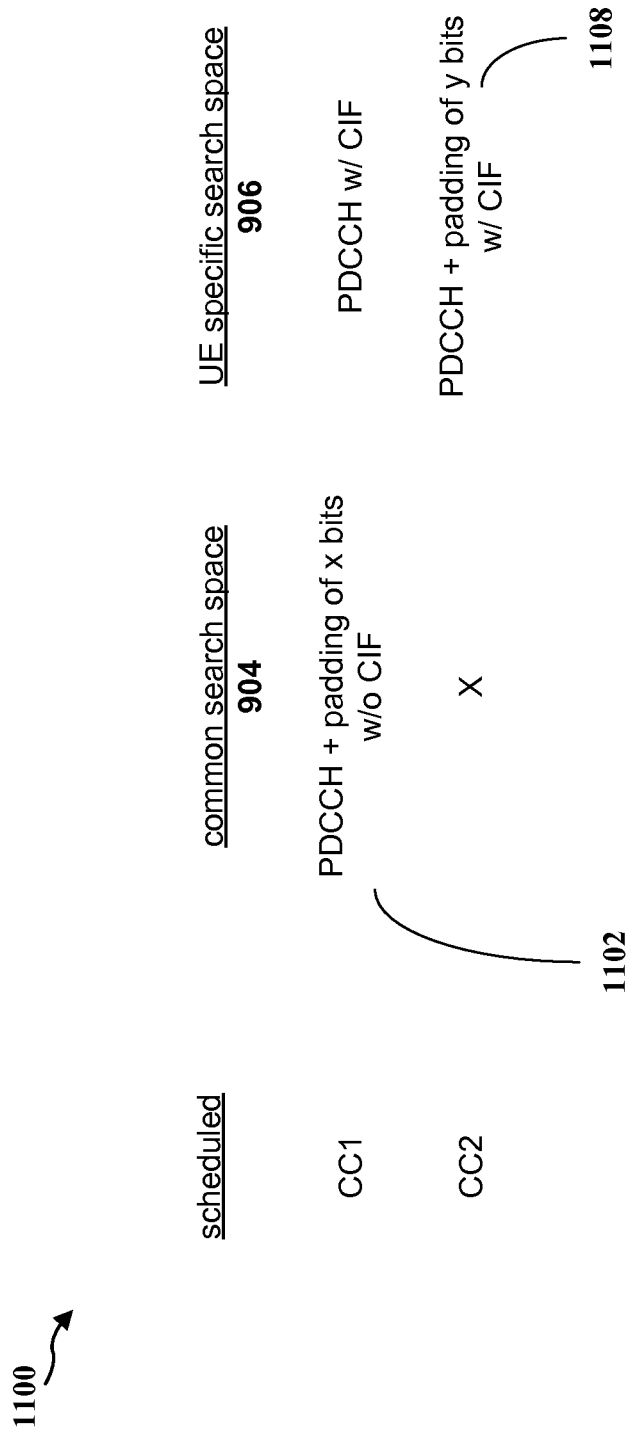
FIG. 11 is a diagram for illustrating a first exemplary method for resolving the potential PDCCH ambiguity.

FIG. 11 is a diagram 1100 for illustrating a first exemplary method for resolving the potential PDCCH ambiguity. In one configuration, the ambiguity is resolved by adding bits to the PDCCH without the CIF transmitted in the common search space 904 for component carrier CC1 (1102) and/or bits to the PDCCH with the CIF transmitted in the UE specific search space 906 for component carrier CC2 (1108). As shown in FIG. 11, x bits may be added to the PDCCH without the CIF and y bits may be added to the PDCCH with the CIF. In one example, when there is no ambiguity, x=0 and y=0, and when there is ambiguity, x=0 and y=1, and therefore no bits are added to the PDCCH without the CIF (1102) and one bit is added to the PDCCH with the CIF (1108) in order to allow the UE 804 to resolve the ambiguity. Padding the PDCCH with CIF in the UE specific search space may be preferable, as backward compatibility can be maintained with UEs operating under earlier LTE releases.

Figure 12:
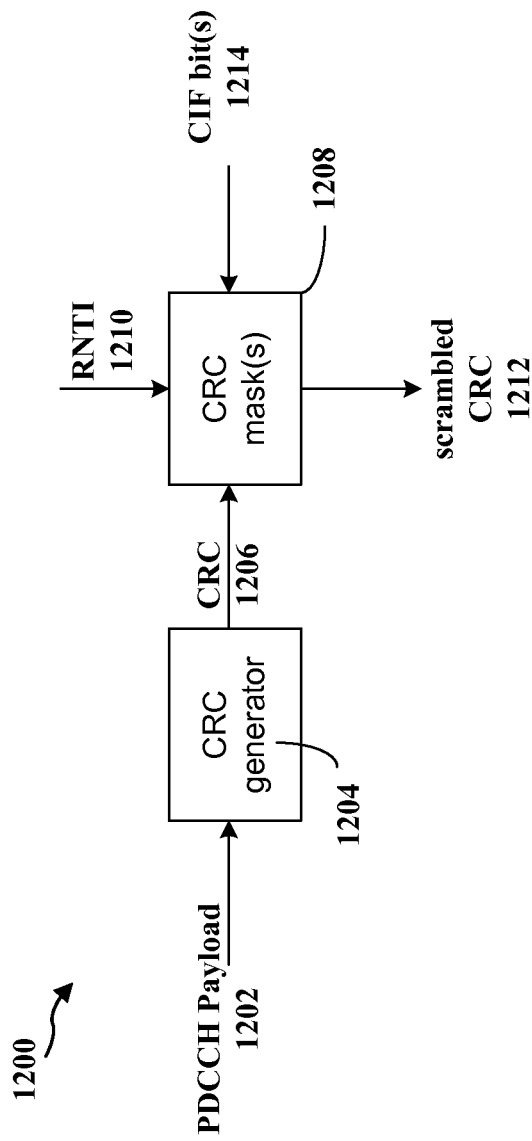
FIG. 12 is a diagram for illustrating a second exemplary method for resolving the potential PDCCH ambiguity.

FIG. 12 is a diagram 1200 for illustrating a second exemplary method for resolving the potential PDCCH ambiguity. As shown in FIG. 12, based on the PDCCH payload 1202, the cyclic redundancy check (CRC) generator 1204 generates a CRC 1206 of parity bits (e.g., 16 parity bits). The CRC 1206 is used for error detection in DCI messages. A CRC mask 1208 is applied to the CRC 1206 based on a radio network temporary identifier (RNTI) 1210. Different RNTI can be used to scramble the CRC. For example, a UE unique identifier such as a UE-RNTI or a cell RNTI (C-RNTI) may be used to scramble the CRC 1206. The C-RNTI is to be used by a UE while the UE is in a particular cell. According to the second exemplary method, when there is PDCCH ambiguity, the CRC 1206 is further scrambled based on whether the CIF is included in the PDCCH payload 1202. As such, an additional CRC mask based on a CIF bit(s) 1214 may be applied to the CRC 1206 on top of the RNTI 1210 when encoding PDCCH. Alternatively, one CRC mask may be applied based on both the RNTI 1210 and the CIF bit(s) 1214 to resolve the PDCCH ambiguity. The CIF bit(s) include a first predetermined set of bits associated with no CIF in the PDCCH payload and a second predetermined set of bits associated with the CIF in the PDCCH payload. The CRC is scrambled with the first or second predetermined set of bits based on whether the CIF is included in the PDCCH payload. The scrambled CRC 1212 is appended to the end of the PDCCH payload. With the additional CRC mask based on the CIF bit(s), the UE 804 can determine whether the PDCCH payload includes a CIF by descrambling the received CRC based on the RNTI and the first predetermined set of bits to create a no-CIF CRC, descrambling the received CRC based on the RNTI and the second predetermined set of bits to create a CIF CRC, generating a CRC based on the received PDCCH payload, and determining whether the generated CRC matches the no-CIF CRC or the CIF CRC.

Figure 13:
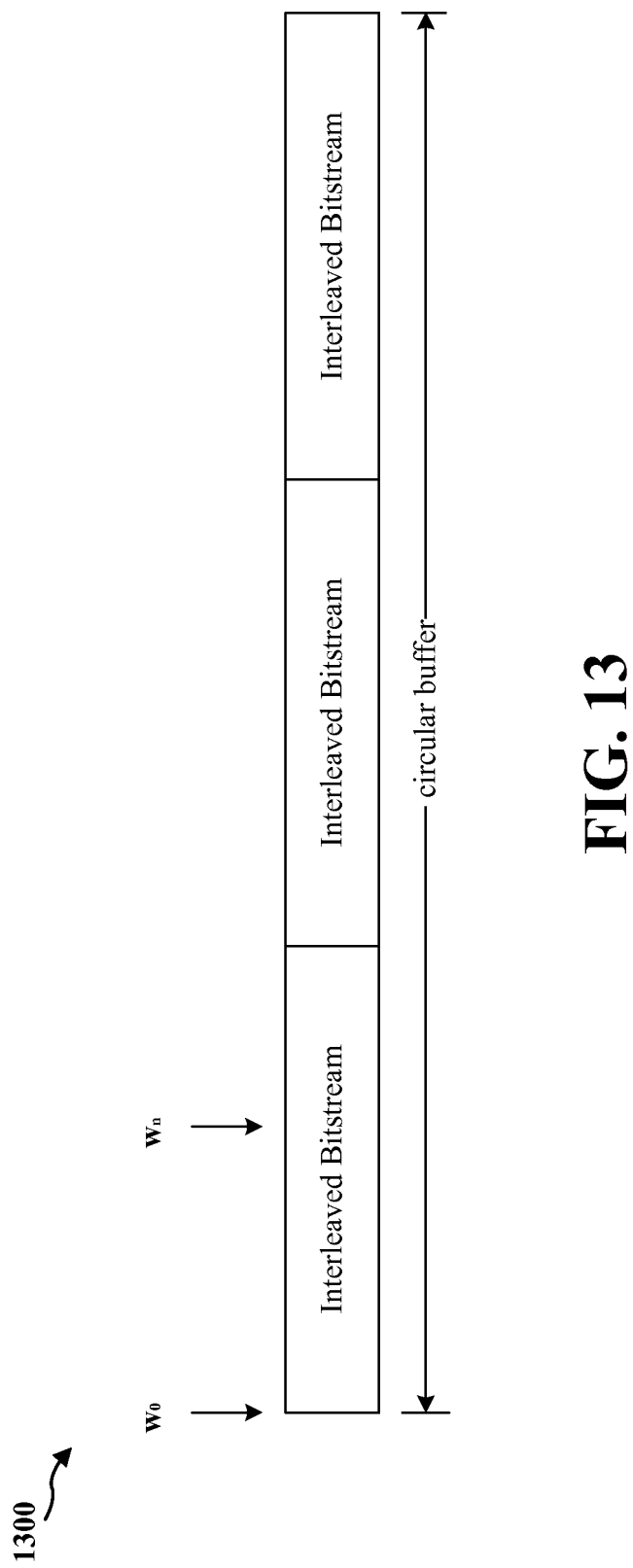
FIG. 13 is a diagram for illustrating a third exemplary method for resolving the potential PDCCH ambiguity.

FIG. 13 is a diagram 1300 for illustrating a third exemplary method for resolving the potential PDCCH ambiguity. To form the PDCCH payload, the DCI undergoes coding including the steps of CRC attachment, discussed supra in relation to FIG. 12, channel coding (i.e., tail biting convolutional coding), and rate matching. Rate matching creates an output stream with a desired code rate. Three bitstreams from a convolutional coder are interleaved and then concatenated to create a virtual circular buffer. According to the third exemplary method, when there is PDCCH ambiguity, a CIF specific shift is applied to rate matching such that the starting point in the virtual circular buffer when applying resource mapping for PDCCH is different for the PDCCH with the CIF and the PDCCH without the CIF. For example, the eNodeB 802 may use the starting point $w_0$ for the PDCCH without the CIF and the starting point $w_n$, where n>0, for the PDCCH with the CIF. With different, predetermined starting points for the component carriers CC1, CC2, the UE 804 will be able to determine for which component carrier the PDCCH applies because if the UE 804 assumes or utilizes the incorrect starting point, the UE 804 will not be able to decode the received PDCCH properly.

Figure 14:
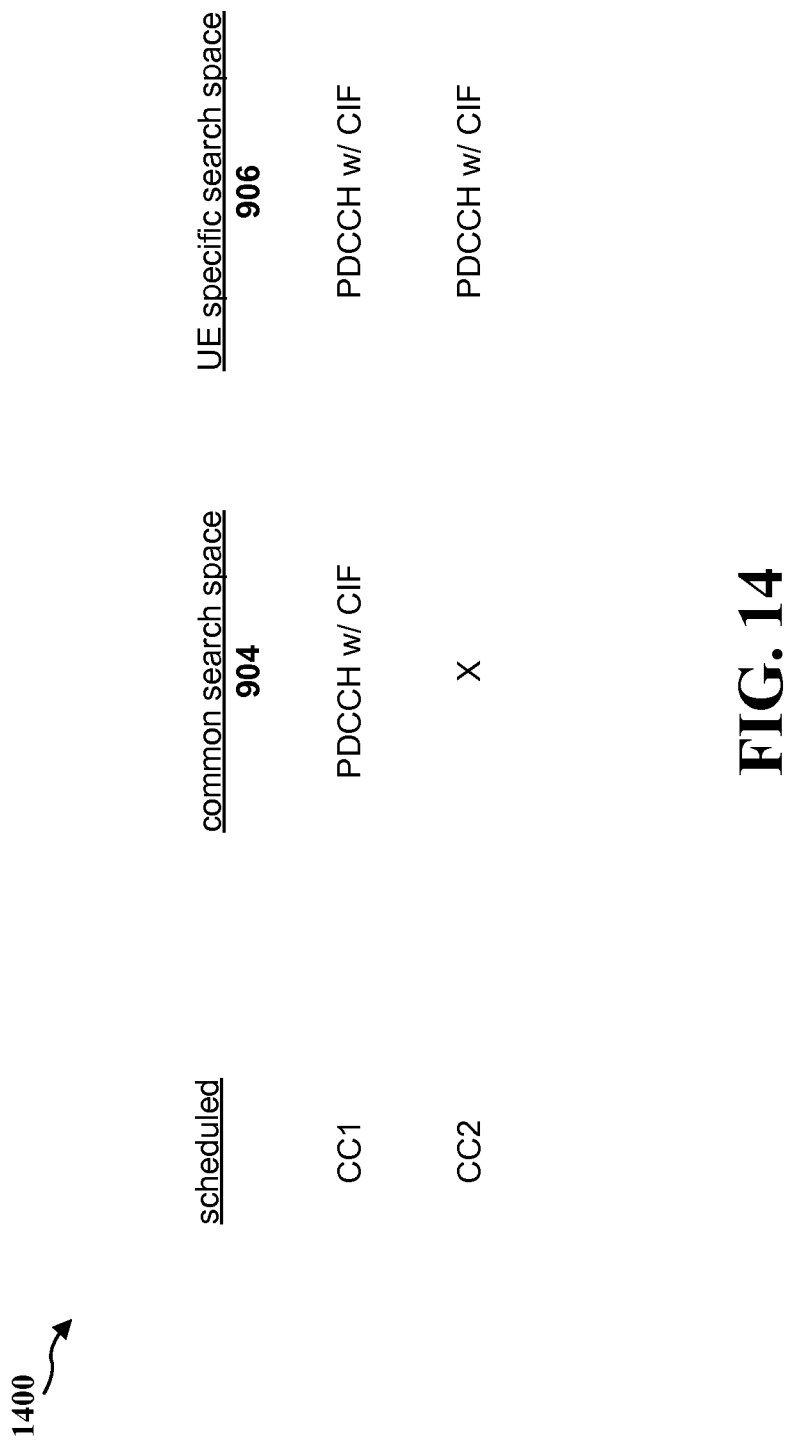
FIG. 14 is a diagram for illustrating a fourth exemplary method for resolving the potential PDCCH ambiguity.

FIG. 14 is a diagram 1400 for illustrating a fourth exemplary method for resolving the potential PDCCH ambiguity. As shown in FIG. 14, in the fourth exemplary method, the CIF is always included in the PDCCH. Always including the CIF would eliminate the ambiguity because the UE 804 would always know the CIF is included in the DCI and could look at the CIF to determine which of the component carriers are scheduled by a grant in the DCI. If there are DCI formats that never have PDCCH ambiguity, the CIF may always be included only in the DCI formats that have PDCCH ambiguity.

Figure 15:
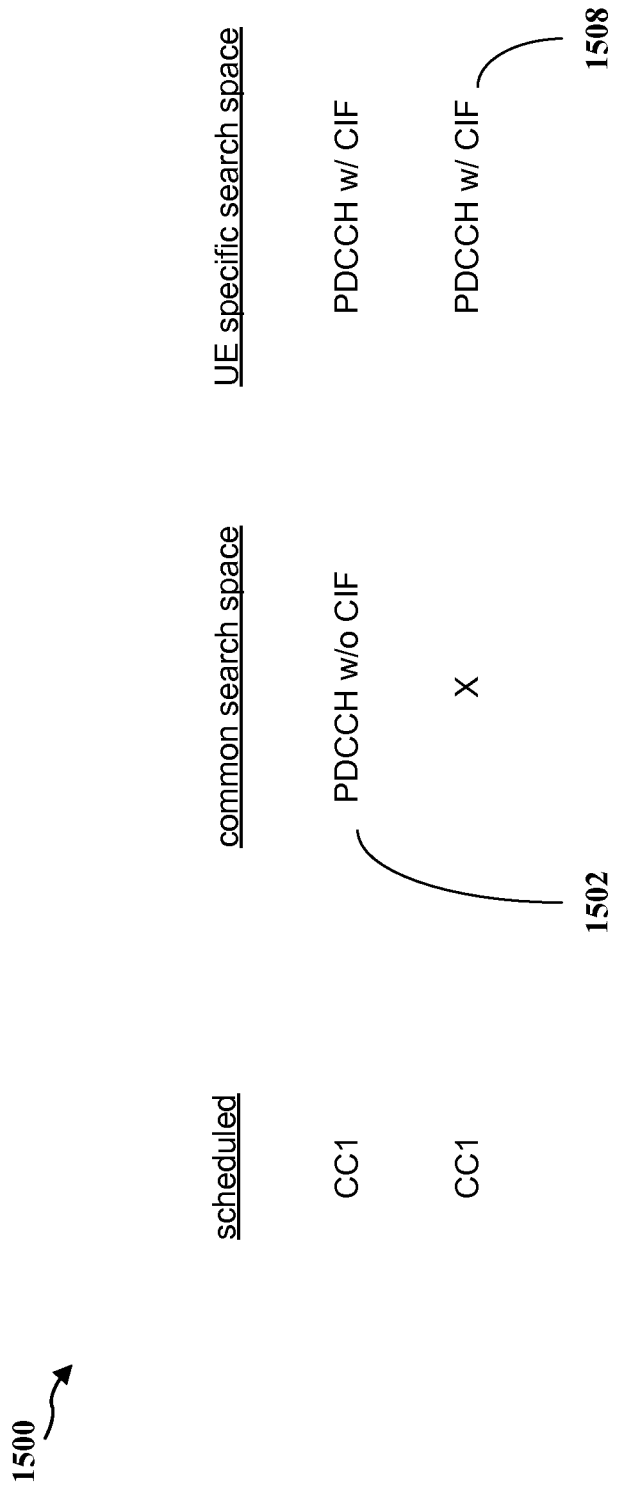
FIG. 15 is a diagram for illustrating a fifth exemplary method for resolving the potential PDCCH ambiguity.

FIG. 15 is a diagram 1500 for illustrating a fifth exemplary method for resolving the potential PDCCH ambiguity. According to the fifth exemplary method, when there is PDCCH ambiguity, the UE 804 assumes the PDCCH does not include the CIF. The PDCCH without the CIF schedules the same component carrier (e.g., primary/anchor carrier, primary cell). As such, the eNodeB 802 should always schedule PDSCH/PUSCH for the primary carrier when there is potential ambiguity. When there is no search space overlapping between two component carriers, PDCCH ambiguity may not exist. However, when there is search space overlapping, the scheduling of other component carriers becomes restricted. Therefore, if there is PDCCH ambiguity (i.e., PDCCH payload is in the overlapping search space and the PDCCH payloads are the same size) and the eNodeB 802 transmits a PDCCH without the CIF for component carrier CC1 to the UE 804 (1502), the UE 802 will assume the PDCCH does not include the CIF and is for the anchor component carrier CC1. Furthermore, if there is PDCCH ambiguity and the eNodeB 802 transmits a PDCCH with the CIF for component carrier CC2 to the UE 804 (1508), the UE 802 will assume the PDCCH does not include the CIF and is for the component carrier CC1. In such a situation, the UE 804 would not be able to decode the received PDCCH properly. As such, according to this method, the eNodeB 802 should not schedule the component carrier CC2 and should only schedule the anchor component carrier CC1 if there is a potential PDCCH ambiguity.

As such, according to the fifth exemplary method, a UE may be configured with a CIF for a given serving cell (e.g., component carrier CC2). In addition, the UE may be configured to monitor PDCCH candidates in the primary cell (e.g., component carrier CC1). When the UE receives information in the PDCCH with a common payload size and in an overlapping search space (i.e., the same first CCE index $n_{CCE}$ in the common search space and the UE specific search space), the UE assumes that the PDCCH in the common search space is for (or transmitted by) the primary cell. In one configuration, the UE assumes the PDCCH in the overlapping search space with a common payload size is for the primary cell only when the information includes a CRC scrambled by C-RNTI. In such a configuration, when the information includes a CRC scrambled by other RNTI other than C-RNTI, there is no PDCCH ambiguity and the UE does not need to make such an assumption.

Figure 16:
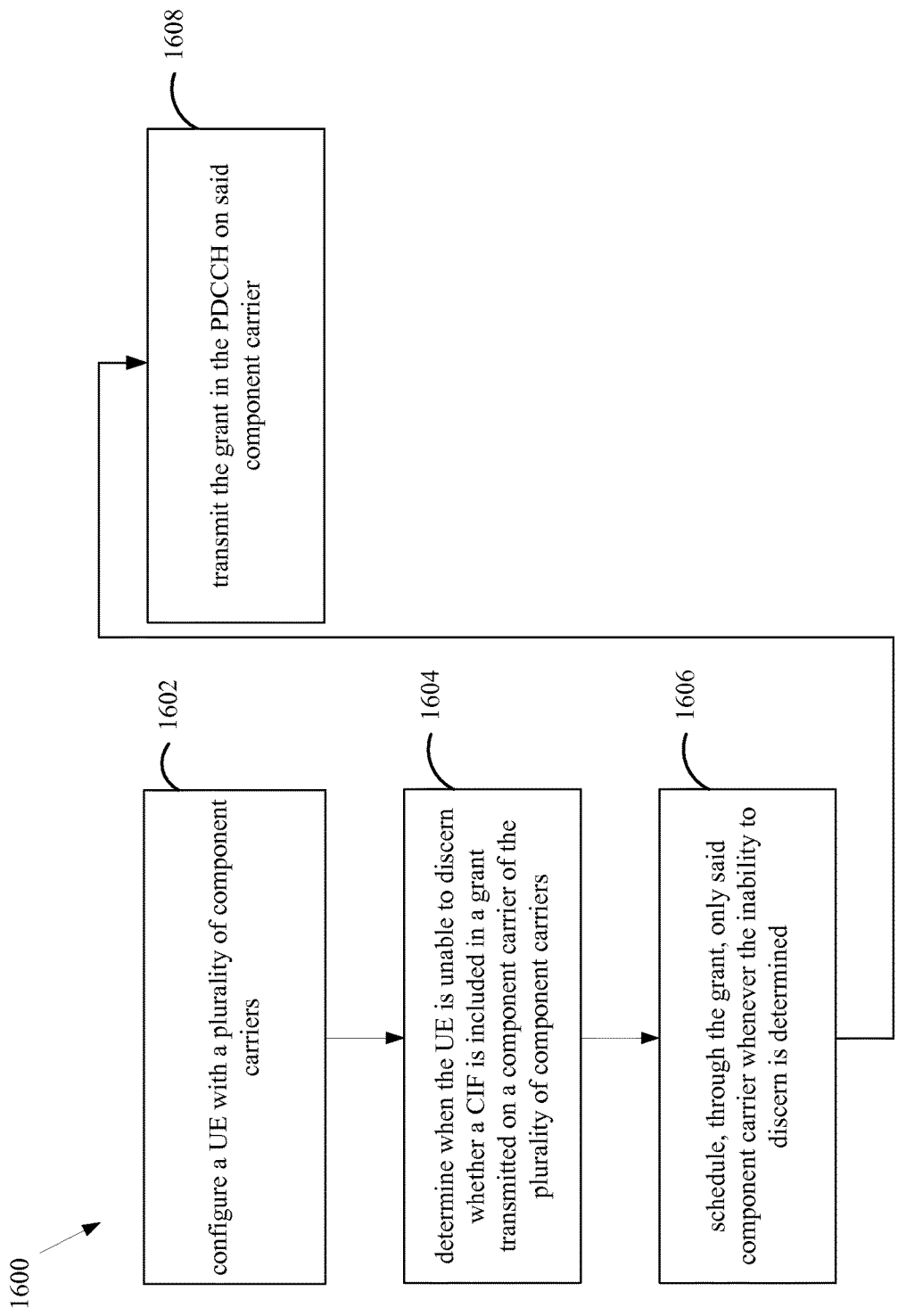
FIG. 16 is a flow chart of a first method of wireless communication.

FIG. 16 is a flow chart 1600 of a first method of wireless communication. The method is performed by an eNodeB, such as the eNodeB 802. According to the method, the eNodeB 802 configures a UE, such as the UE 804, with a plurality of component carriers (1602). In addition, the eNodeB determines when the UE is unable to discern whether a CIF is included in a grant transmitted on a component carrier of the plurality of component carriers (1604). Furthermore, the eNodeB schedules, through the grant, only said component carrier whenever the inability to discern is determined (1606). The eNodeB may transmit the grant in the PDCCH on said component carrier (1608). The component carrier may be a primary component carrier. In LTE Release 10, there is only one primary component carrier. Remaining component carriers are secondary component carriers. For example, component carrier CC1 may carry PDCCH for itself and component carrier CC2 and component carrier CC3 may carry PDCCH for itself and component carrier CC4. If component carrier CC1 is the primary component carrier, component carriers CC2, CC3, and CC4 are secondary component carriers. In one configuration, the plurality of component carriers includes the primary component carrier and at least one secondary component carrier and the CIF indicates one component carrier of the plurality of component carriers to which the grant applies. In one configuration, the grant is one of an UL grant scheduling the UE to transmit traffic data in the PUSCH or a DL grant scheduling the UE to receive traffic data in the PDSCH. In one configuration, only said component carrier is scheduled when the grant is located in an overlapping search space of a common search space and a UE specific search space and the UE receiving the grant would be unable to discern whether the CIF is included in the grant based on a payload size of the grant.

Figure 17:
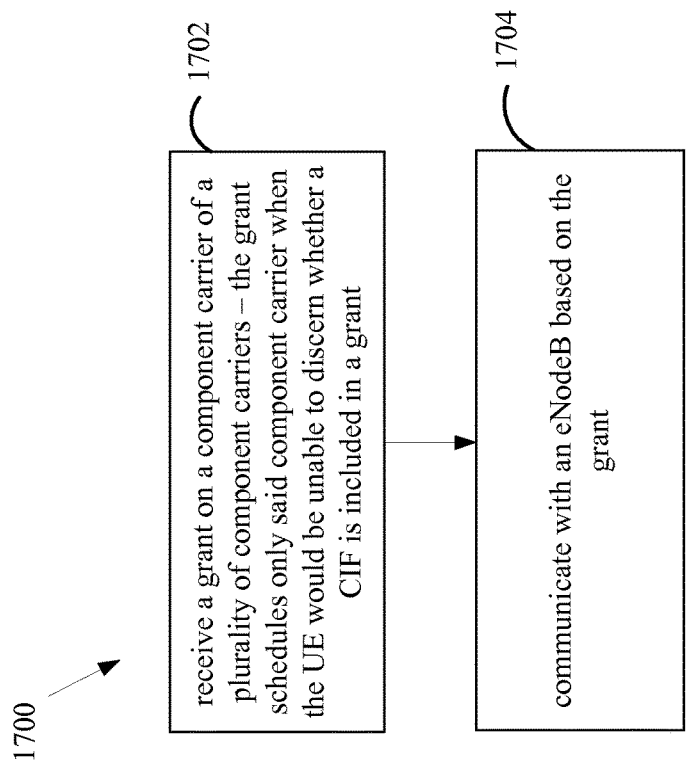
FIG. 17 is a flow chart of a second method of wireless communication.

FIG. 17 is a flow chart 1700 of a second method of wireless communication. The method is performed by a UE, such as the UE 804. According to the method, the UE receives a grant on a component carrier of a plurality of component carriers (1702). The grant schedules only said component carrier when the UE would be unable to discern whether a CIF is included in a grant (1702). In addition, the UE communicates with an eNodeB based on the grant (1704). In one configuration, the grant is received in the PDCCH. In one configuration, said component carrier is a primary component carrier. In one configuration, the plurality of component carriers includes the primary component carrier and at least one secondary component carrier and the CIF indicates one component carrier of the plurality of component carriers to which the grant applies. In one configuration, the grant schedules only said component carrier only when a CRC appended to the grant is scrambled with a C-RNTI. In one configuration, the grant is one of an UL grant scheduling the UE to transmit traffic data in the PUSCH or a DL grant scheduling the UE to receive traffic data in the PDSCH. In one configuration, the grant schedules only said component carrier when the grant is received in an overlapping search space of a common search space and a UE-specific search space and the UE receiving the grant would be unable to discern whether the CIF is included in the grant based on a payload size of the grant.

Figure 18:
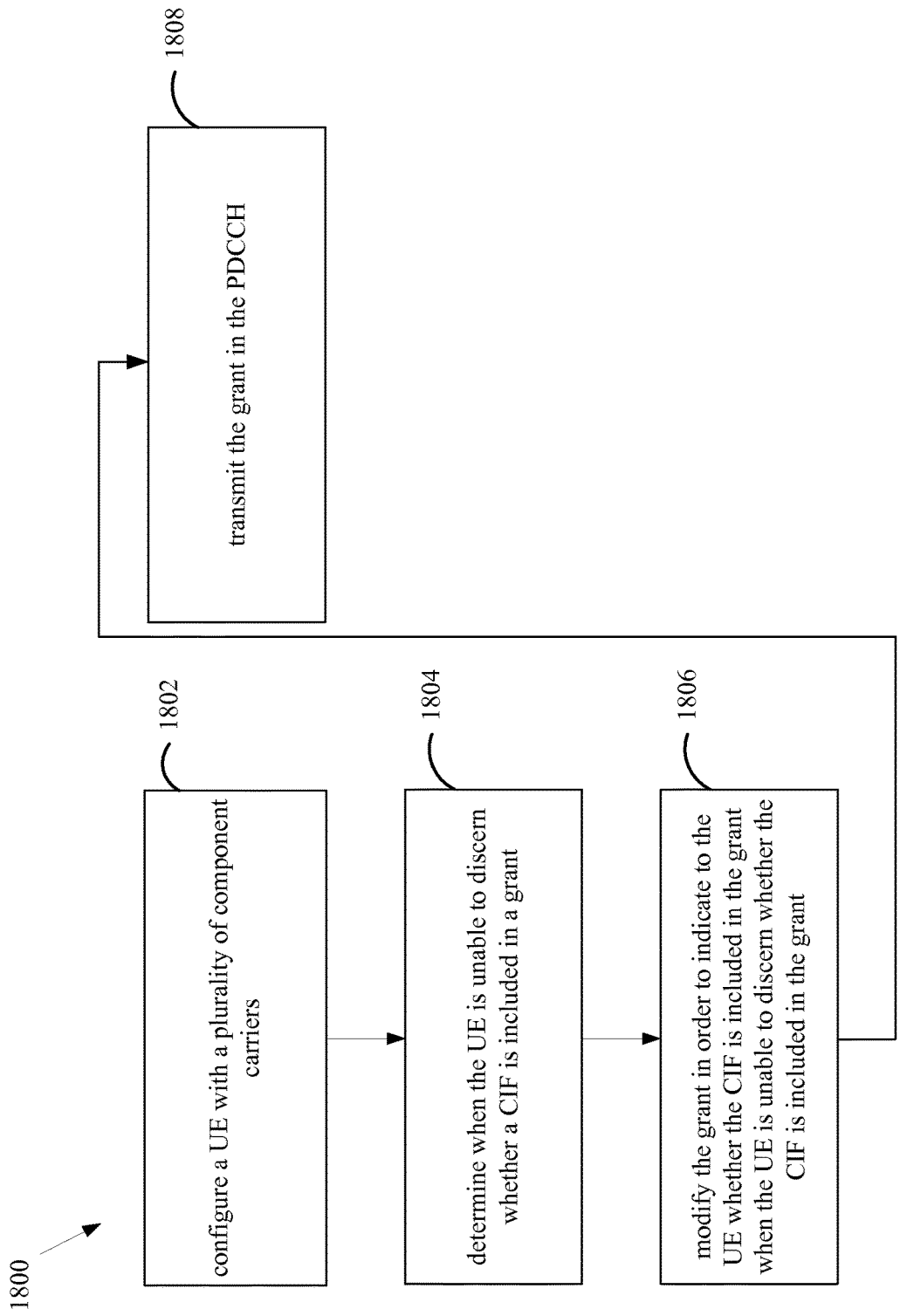
FIG. 18 is a flow chart of a third method of wireless communication.

FIG. 18 is a flow chart 1800 of a third method of wireless communication. The method is performed by an eNodeB, such as the eNodeB 802. According to the method, the eNodeB 802 configures a UE, such as the UE 804, with a plurality of component carriers (1802). In addition, the eNodeB determines when the UE is unable to discern whether a CIF is included in a grant (1804). Furthermore, the eNodeB modifies the grant in order to indicate to the UE whether the CIF is included in the grant when the UE is unable to discern whether the CIF is included in the grant (1806). The eNodeB may transmit the grant in the PDCCH (1808). In one configuration, the grant is transmitted in a primary component carrier of the plurality of component carriers, the plurality of component carriers includes the primary component carrier and at least one secondary component carrier, and the CIF indicates one component carrier of the plurality of component carriers to which the grant applies. In one configuration, the grant is one of an UL grant scheduling the UE to transmit traffic data in the PUSCH or a DL grant scheduling the UE to receive traffic data in the PDSCH.

Figure 19:
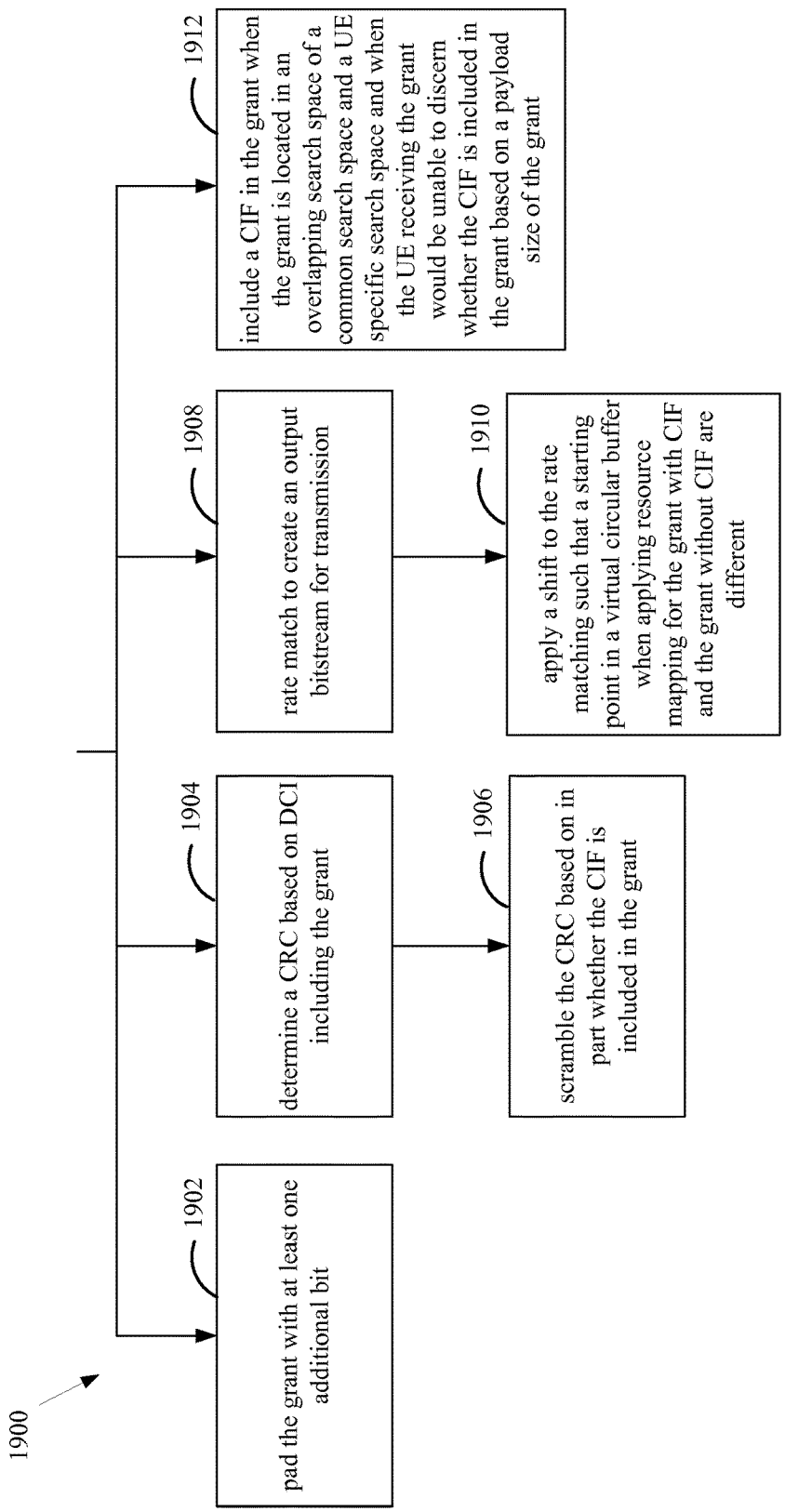
FIG. 19 is a second flow chart of the third method of wireless communication.

FIG. 19 is a second flow chart 1900 of the third method of wireless communication. The method is performed by an eNodeB, such as the eNodeB 802. In a first configuration, the eNodeB pads the grant with at least one additional bit (1902). The grant may be padded with the at least one additional bit only when the grant is transmitted in a UE specific search space for a secondary component carrier. In a second configuration, the eNodeB determines a CRC based on DCI including the grant (1904). In such a configuration, the eNodeB scrambles the CRC based on in part whether the CIF is included in the grant (1906). In a third configuration, the eNodeB rate matches to create an output bitstream for transmission (1908). In such a configuration, the eNodeB applies a shift to the rate matching such that a starting point in a virtual circular buffer when applying resource mapping for the grant with CIF and the grant without CIF are different (1910). In a fourth configuration, the eNodeB includes a CIF in the grant when the grant is located in an overlapping search space of a common search space and a UE specific search space and when the UE receiving the grant would be unable to discern whether the CIF is included in the grant based on a payload size of the grant (1912).

Figure 20:
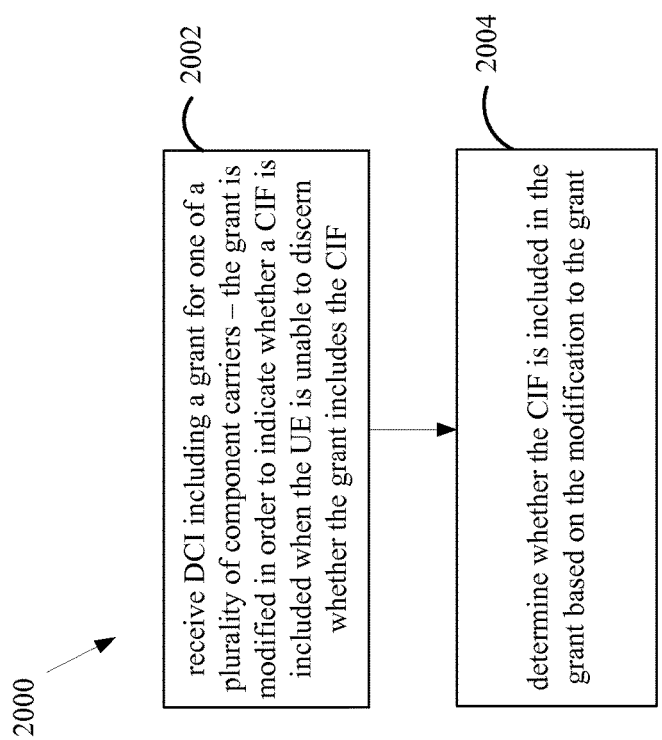
FIG. 20 is a flow chart of a fourth method of wireless communication.

FIG. 20 is a flow chart of a fourth method of wireless communication. The method is performed by a UE, such as the UE 804. The UE receives DCI including a grant for one of a plurality of component carriers (2002). The grant is modified in order to indicate whether a CIF is included when the UE is unable to discern whether the grant includes the CIF (2002). In addition, the UE determines whether the CIF is included in the grant based on the modification to the grant (2004). In one configuration, the grant is received in the PDCCH. In one configuration, the grant is received in a primary component carrier of the plurality of component carriers, the plurality of component carriers includes the primary component carrier and at least one secondary component carrier, and the CIF indicates one component carrier of the plurality of component carriers to which the grant applies. In one configuration, the grant is one of an UL grant scheduling the UE to transmit traffic data in the PUSCH or a DL grant scheduling the UE to receive traffic data in the PDSCH. In one configuration, the UE determines whether the CIF is included in the grant based on padding included in the grant. The grant may be padded with at least one additional bit only when the grant is received in a UE specific search space for a secondary component carrier. In one configuration, the grant always includes the CIF when the grant is received in an overlapping search space of a common search space and a UE-specific search space and the UE would be unable to discern whether the CIF is included in the grant based on a payload size of the grant.

Figure 21:
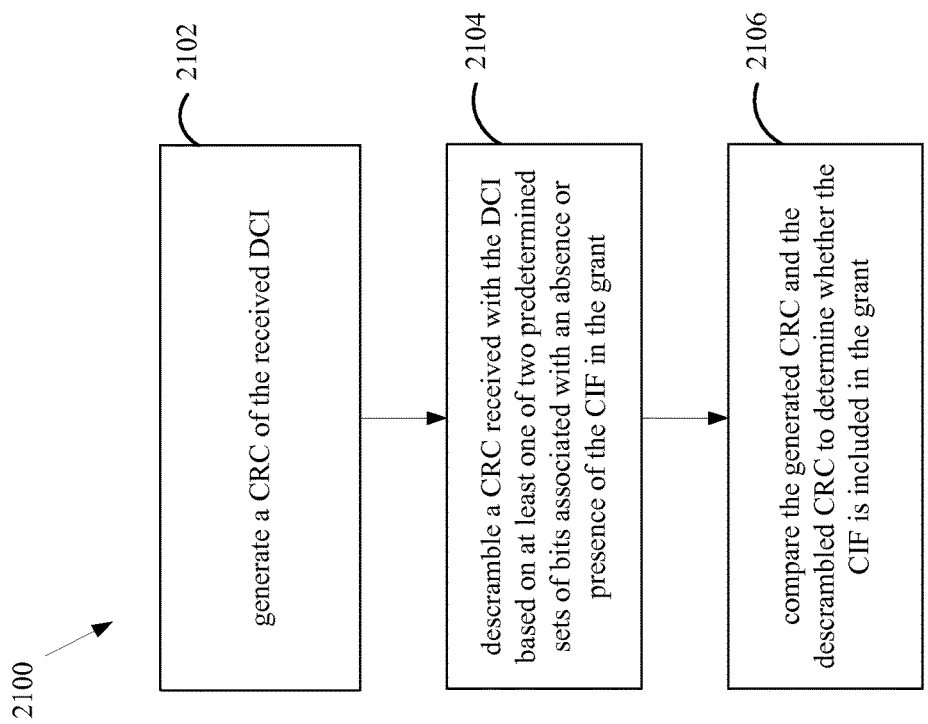
FIG. 21 is a second flow chart of the fourth method of wireless communication.

FIG. 21 is a second flow chart of the fourth method of wireless communication. The method is performed by a UE, such as the UE 804. According to the method, the UE generates a CRC of the received DCI (2102). In addition, the UE descrambles a CRC received with the DCI based on at least one of two predetermined sets of bits associated with an absence or presence of the CIF in the grant (2104). Furthermore, the UE compares the generated CRC and the descrambled CRC to determine whether the CIF is included in the grant (2106).

Figure 22:
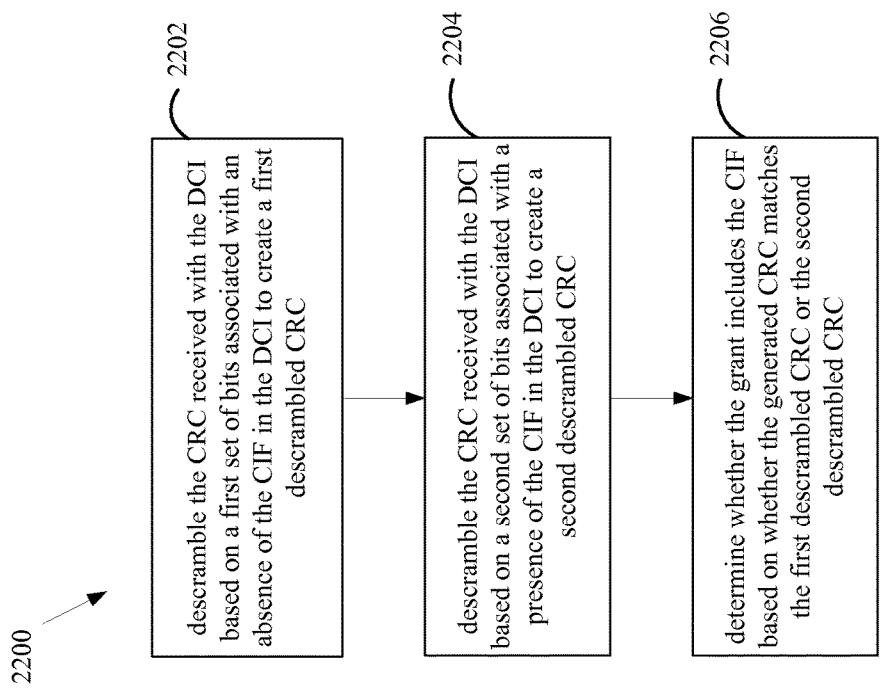
FIG. 22 is a third flow chart of the fourth method of wireless communication.

FIG. 22 is a third flow chart of the fourth method of wireless communication. The method is performed by a UE, such as the UE 804. According to the method, the UE descrambles the CRC by descrambling the CRC received with the DCI based on a first set of bits associated with an absence of the CIF in the DCI to create a first descrambled CRC (2202) and descrambling the CRC received with the DCI based on a second set of bits associated with a presence of the CIF in the DCI to create a second descrambled CRC (2204). The UE then determines whether the grant includes the CIF based on whether the generated CRC matches the first descrambled CRC or the second descrambled CRC (2206).

Figure 23:
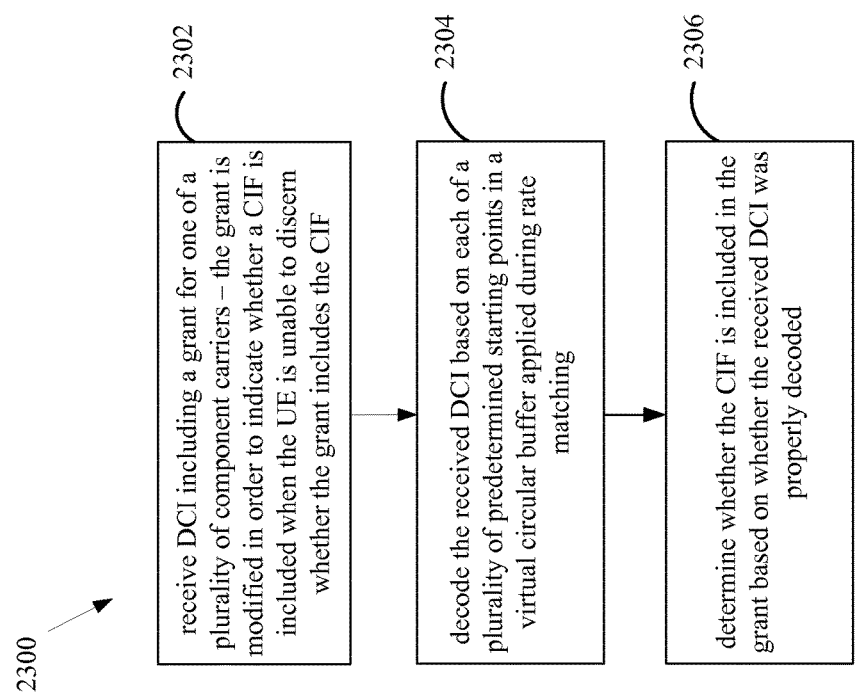
FIG. 23 is a fourth flow chart of the fourth method of wireless communication.

FIG. 23 is a fourth flow chart of the fourth method of wireless communication. The method is performed by a UE, such as the UE 804. According to the method, the UE receives DCI including a grant for one of a plurality of component carriers (2302). The grant is modified in order to indicate whether a CIF is included when the UE is unable to discern whether the grant includes the CIF (2302). In addition, the UE decodes the received DCI based on each of a plurality of predetermined starting points in a virtual circular buffer applied during rate matching (2304). Furthermore, the UE determines whether the CIF is included in the grant based on whether the received DCI was properly decoded (2306). The plurality of predetermined starting points may include a first starting point utilized when the CIF is included in the grant and a second starting point, different than the first starting point, utilized when the CIF is not included in the grant.

Figure 24:
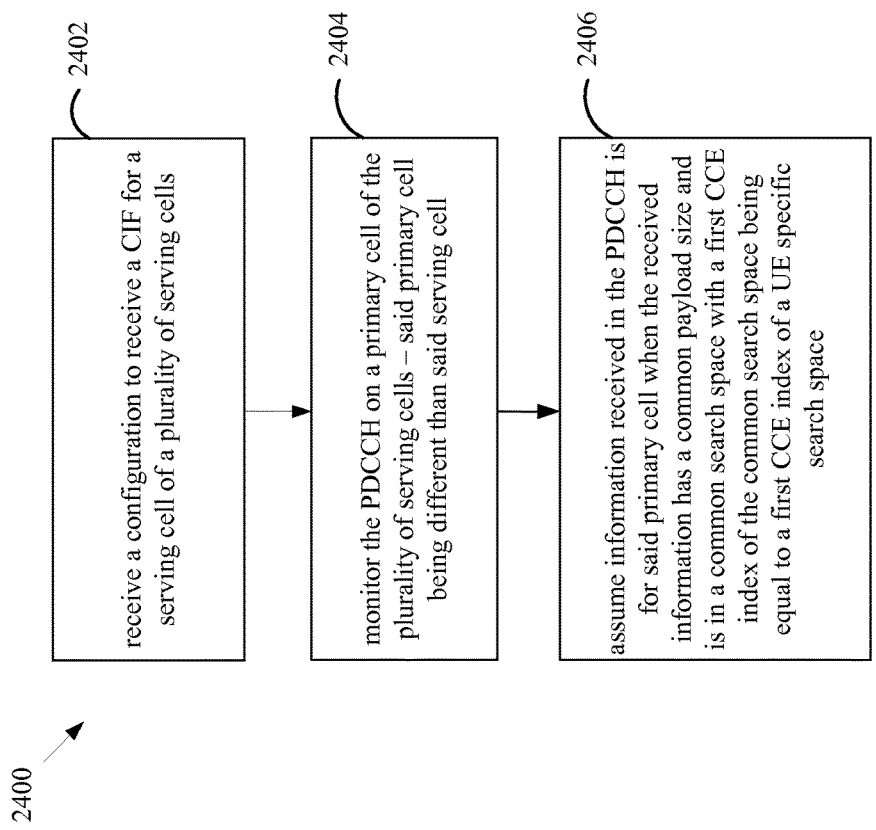
FIG. 24 is a flow chart of another method of wireless communication.

FIG. 24 is a flow chart of another method of wireless communication. The method is performed by a UE, such as the UE 804. According to the method, the UE receives a configuration to receive a CIF for a serving cell of a plurality of serving cells (2402). In addition, the UE monitors the PDCCH on a primary cell of the plurality of serving cells (2404). The primary cell is different than said serving cell (2404). Furthermore, the UE assumes information received in the PDCCH is for said primary cell when the received information has a common payload size and is in a common search space with a first CCE index of/in the common search space being equal to a first CCE index of/in a UE specific search space (2406). The common payload size is an equal payload size whether the information is assumed to be for said serving cell or said primary cell. As such, the common payload size is equal to a payload size of the received information assuming the received information includes the CIF and is for said serving cell and is equal to a payload size of the received information assuming the information does not include the CIF and is for said primary cell. As discussed supra, the information received in the PDCCH may be assumed to be for said primary cell only when the information includes a CRC scrambled with a C-RNTI.

Accordingly, a UE configured with a CIF for a given serving cell and configured to monitor PDCCH candidates with a CRC scrambled by C-RNTI with a common payload size and with the same first CCE index $n_{CCE}$ in the common search space and the UE specific search space may assume that only the PDCCH in the common search space is transmitted by (i.e., for) the primary cell.

Figure 25:
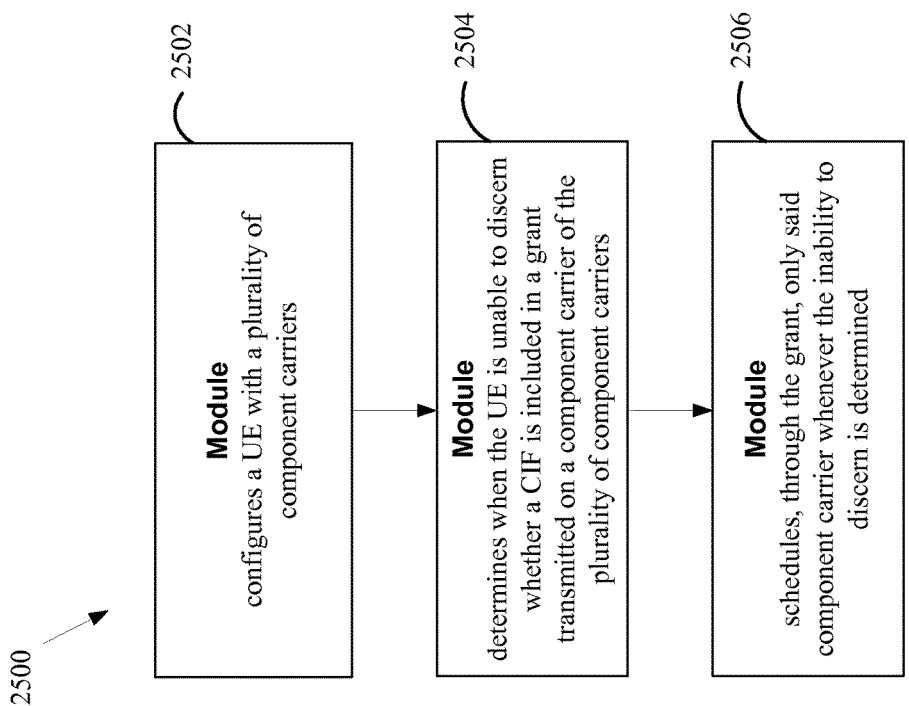
FIG. 25 is a conceptual block diagram illustrating the functionality of an exemplary apparatus.

FIG. 25 is a conceptual block diagram 2500 illustrating the functionality of an exemplary eNodeB apparatus 100. The apparatus 100 includes a module 2502 that configures a UE with a plurality of component carriers. In addition, the apparatus 100 includes a module 2504 that determines when the UE is unable to discern whether a CIF is included in a grant transmitted on a component carrier of the plurality of component carriers. Furthermore, the apparatus 100 includes a module 2506 that schedules, through the grant, only said component carrier whenever the inability to discern is determined. The apparatus 100 may include additional modules that perform each of the steps not included in FIG. 25, but that are in the aforementioned flow chart of FIG. 16. As such, each step in the aforementioned flow chart of FIG. 16 may be performed by a module and the apparatus 100 may include one or more of those modules.

Figure 26:
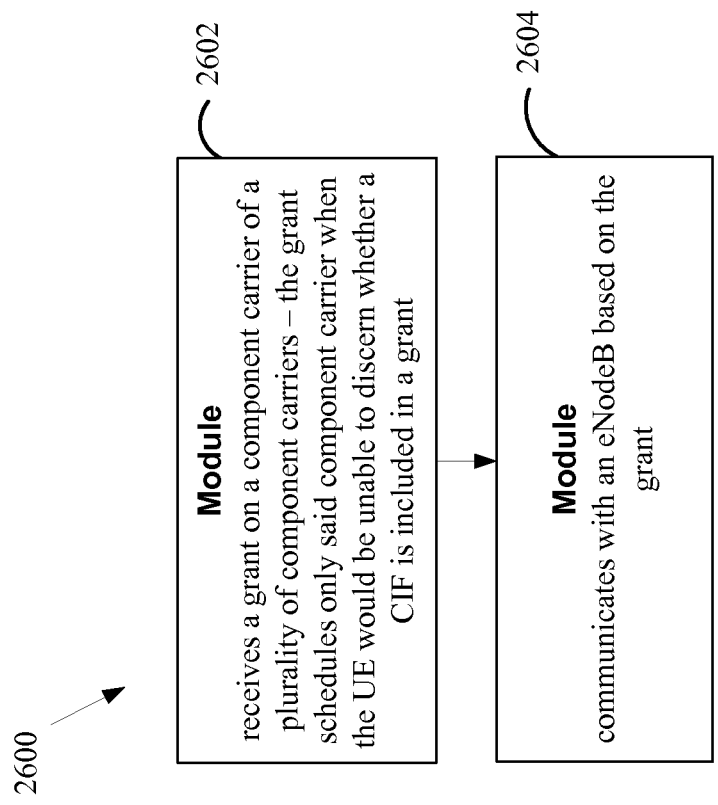
FIG. 26 is a conceptual block diagram illustrating the functionality of another exemplary apparatus.

FIG. 26 is a conceptual block diagram 2600 illustrating the functionality of another exemplary UE apparatus 100. The apparatus 100 includes a module 2602 that receives a grant on a component carrier of a plurality of component carriers. The grant schedules only said component carrier when the UE would be unable to discern whether a CIF is included in a grant. In addition, the apparatus 100 includes a module 2604 that communicates with an eNodeB based on the grant.

Figure 27:
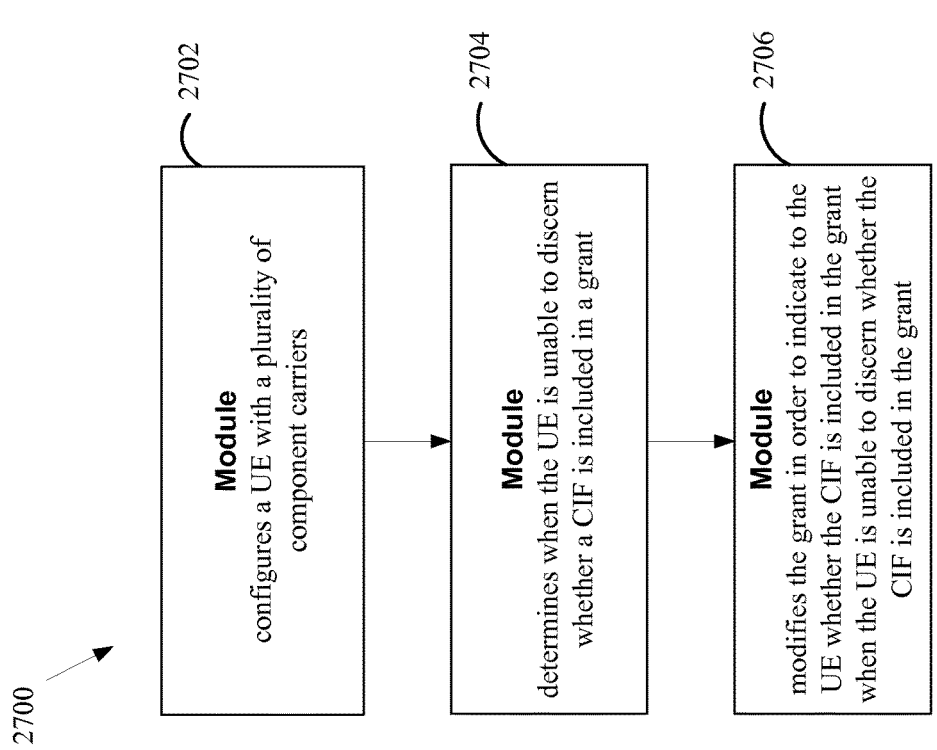
FIG. 27 is a conceptual block diagram illustrating the functionality of yet another exemplary apparatus.

FIG. 27 is a conceptual block diagram 2700 illustrating the functionality of another exemplary eNodeB apparatus 100. The apparatus 100 includes a module 2702 that configures a UE with a plurality of component carriers. In addition, the apparatus 100 includes a module 2704 that determines when the UE is unable to discern whether a CIF is included in a grant. Furthermore, the apparatus 100 includes a module 2706 that modifies the grant in order to indicate to the UE whether the CIF is included in the grant when the UE is unable to discern whether the CIF is included in the grant. The apparatus 100 may include additional modules that perform each of the steps not included in FIG. 27, but that are in the aforementioned flow charts of FIG. 18 and FIG. 19. As such, each step in the aforementioned flow charts of FIG. 18 and FIG. 19 may be performed by a module and the apparatus 100 may include one or more of those modules.

Figure 28:
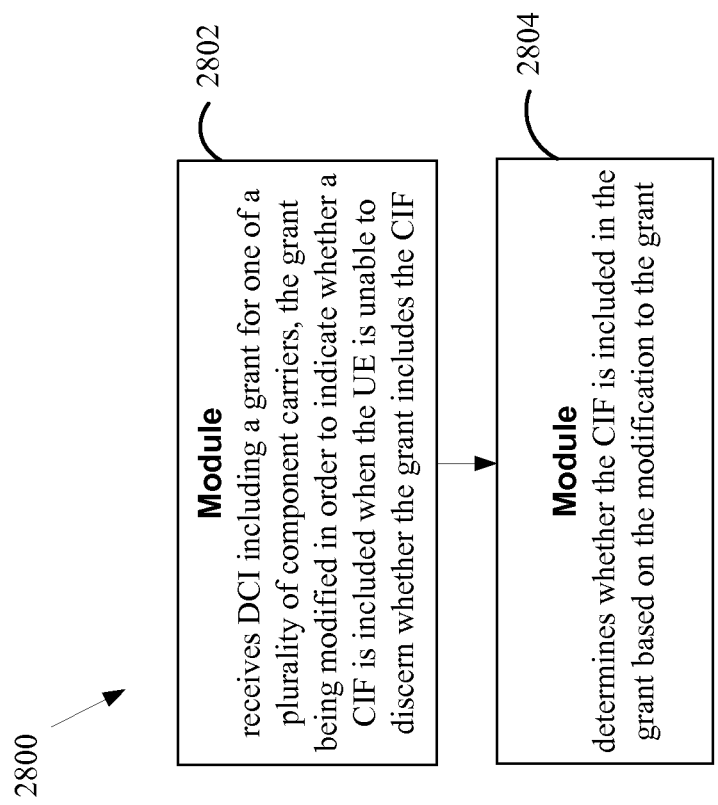
FIG. 28 is a conceptual block diagram illustrating the functionality of yet another exemplary apparatus.

FIG. 28 is a conceptual block diagram 2800 illustrating the functionality of another exemplary UE apparatus 100. The apparatus 100 includes a module 2802 that receives DCI including a grant for one of a plurality of component carriers. The grant is modified in order to indicate whether a CIF is included when the UE is unable to discern whether the grant includes the CIF. In addition, the apparatus 100 includes a module 2804 that determines whether the CIF is included in the grant based on the modification to the grant. The apparatus 100 may include additional modules that perform each of the steps not included in FIG. 28, but that are in the aforementioned flow charts of FIGS. 20-23. As such, each step in the aforementioned flow charts of FIGS. 20-23 may be performed by a module and the apparatus 100 may include one or more of those modules.

Figure 29:
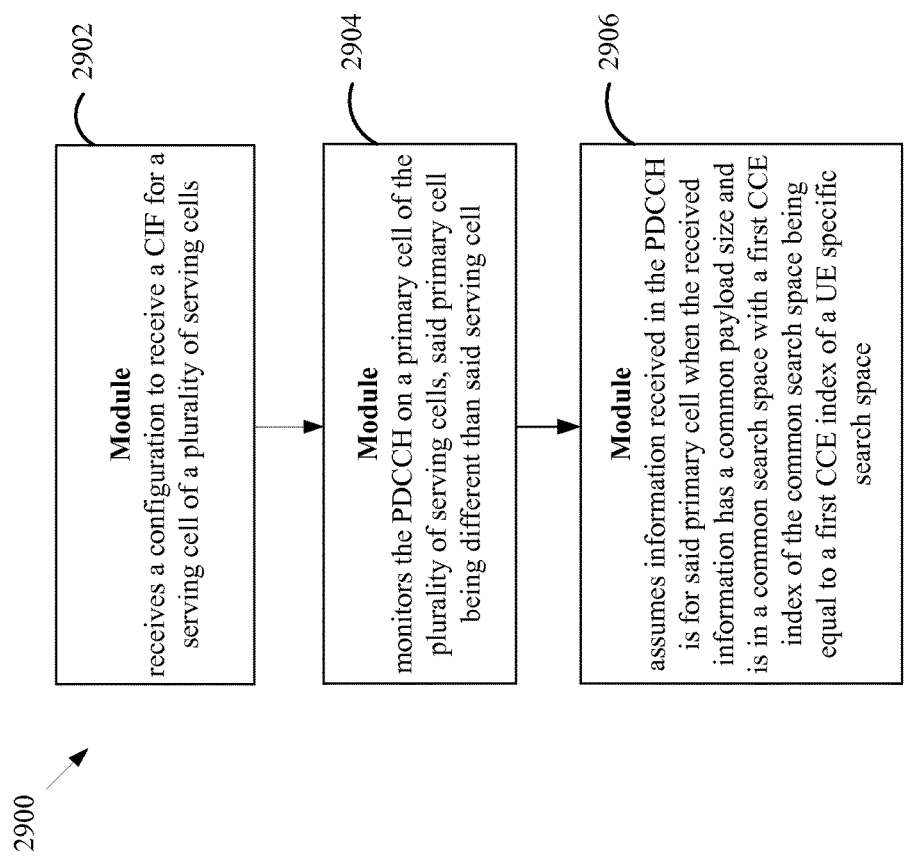
FIG. 29 is a conceptual block diagram illustrating the functionality of yet another exemplary apparatus.

FIG. 29 is a conceptual block diagram 2800 illustrating the functionality of another exemplary UE apparatus 100. The apparatus 100 includes a module 2902 that receives a configuration to receive a CIF for a serving cell of a plurality of serving cells. In addition, the apparatus 100 includes a module 2904 that monitors the PDCCH on a primary cell of the plurality of serving cells. The primary cell is different than said serving cell. Furthermore, the apparatus 100 includes a module 2906 that assumes information received in the PDCCH is for said primary cell when the received information has a common payload size and is in a common search space with a first CCE index of the common search space being equal to a first CCE index of a UE specific search space. The common payload size is an equal payload size whether the information is assumed to be for said serving cell or said primary cell. As such, the common payload size is equal to a payload size of the received information assuming the received information includes the CIF and is for said serving cell and is equal to a payload size of the received information assuming the information does not include the CIF and is for said primary cell. As discussed supra, the information received in the PDCCH may be assumed to be for said primary cell only when the information includes a CRC scrambled with a C-RNTI.

Referring to FIG. 1 and FIG. 7, in one configuration, the apparatus 100 for wireless communication is an eNodeB, such as the eNodeB 802, and includes means for configuring a UE with a plurality of component carriers, means for determining when the UE is unable to discern whether a CIF is included in a grant transmitted on a component carrier of the plurality of component carriers, and means for scheduling, through the grant, only said component carrier whenever the inability to discern is determined. The apparatus 100 may further include means for transmitting the grant in the PDCCH on said component carrier. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and/or the controller/processor 775 configured to perform the functions recited by the aforementioned means.

In one configuration, the apparatus 100 for wireless communication is a UE, such as the UE 804, and includes means for receiving a grant on a component carrier of a plurality of component carriers, and means for communicating with an eNodeB based on the grant. The grant schedules only said component carrier when the apparatus would be unable to discern whether a CIF is included in a grant. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and/or the controller/processor 759 configured to perform the functions recited by the aforementioned means.

In one configuration, the apparatus 100 for wireless communication is an eNodeB, such as the eNodeB 802, and includes means for configuring a UE with a plurality of component carriers, means for determining when the UE is unable to discern whether a CIF is included in a grant, and means for modifying the grant in order to indicate to the UE whether the CIF is included in the grant when the UE is unable to discern whether the CIF is included in the grant. The apparatus 100 may further include means for transmitting the grant in the PDCCH. The apparatus 100 may further include means for determining a CRC based on DCI including the grant. In such a configuration, the means for modifying scrambles the CRC based on in part whether the CIF is included in the grant. The apparatus 100 may further include means for rate matching to create an output bitstream for transmission. In such a configuration, the means for modifying applies a shift to the rate matching such that a starting point in a virtual circular buffer when applying resource mapping for the grant with CIF and the grant without CIF are different. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and/or the controller/processor 775 configured to perform the functions recited by the aforementioned means.

In one configuration, the apparatus 100 for wireless communication is a UE, such as the UE 804, and includes means for receiving DCI including a grant for one of a plurality of component carriers. The grant is modified in order to indicate whether a CIF is included when the apparatus is unable to discern whether the grant includes the CIF. The apparatus 100 further includes means for determining whether the CIF is included in the grant based on the modification to the grant. The apparatus 100 may further include means for generating a CRC of the received DCI, means for descrambling a CRC received with the DCI based on at least one of two predetermined sets of bits associated with an absence or presence of the CIF in the grant, and means for comparing the generated CRC and the descrambled CRC to determine whether the CIF is included in the grant. In one configuration, the means for descrambling the CRC may include means for descrambling the CRC received with the DCI based on a first set of bits associated with an absence of the CIF in the DCI to create a first descrambled CRC, and means for descrambling the CRC received with the DCI based on a second set of bits associated with a presence of the CIF in the DCI to create a second descrambled CRC. In such a configuration, the apparatus 100 further includes means for determining whether the grant includes the CIF based on whether the generated CRC matches the first descrambled CRC or the second descrambled CRC. The apparatus 100 may further include means for decoding the received DCI based on each of a plurality of predetermined starting points in a virtual circular buffer applied during rate matching. In such a configuration, the means for determining whether the CIF is included in the grant is based on whether the received DCI was properly decoded. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and/or the controller/processor 759 configured to perform the functions recited by the aforementioned means.

In one configuration, the apparatus 100 for wireless communication is a UE, such as the UE 804, and includes means for receiving a configuration to receive a CIF for a serving cell of a plurality of serving cells. In addition, the apparatus 100 includes means for monitoring the PDCCH on a primary cell of the plurality of serving cells. Said primary cell is different than said serving cell. Furthermore, the apparatus 100 includes means for assuming information received in the PDCCH is for said primary cell when the received information has a common payload size and is in a common search space with a first CCE index in the common search space being equal to a first CCE index in a UE specific search space. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and/or the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of wireless communication, comprising:
    configuring, via one or more processors, a user equipment (UE) with a plurality of component carriers;
    determining, via the one or more processors, when the UE would be unable to discern whether a carrier indicator field (CIF) is included in a grant transmitted on a component carrier of the plurality of component carriers; and
    scheduling, through the grant, via the one or more processors, only said component carrier when the inability to discern is determined, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the UE receiving the grant would be unable to discern whether the CIF is included in the grant based on a payload size of the grant, the common search space overlapping with the UE specific search space when a first control channel element (CCE) index of the common search space and the UE specific search space are the same.

2. The method of claim 1, further comprising transmitting the grant in a physical downlink control channel (PDCCH) on said component carrier.

3. The method of claim 1, wherein only said component carrier is scheduled only when a cyclic redundancy check (CRC) appended to the grant is scrambled with a cell radio network temporary identifier (C-RNTI).

4. The method of claim 1, wherein the grant is one of an uplink (UL) grant scheduling the UE to transmit traffic data in a physical uplink shared channel (PUSCH) or a downlink (DL) grant scheduling the UE to receive traffic data in a physical downlink shared channel (PDSCH).

5. A method of operating a user equipment (UE), comprising:
    receiving, via one or more processors, a grant on a component carrier of a plurality of component carriers; and
    communicating, via the one or more processors, with an eNodeB based on the grant,
    wherein the grant schedules only said component carrier when the eNodeB determines that the UE would be unable to discern whether a carrier indicator field (CIF) is included in the grant, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the UE receiving the grant would be unable to discern whether the CIF is included in the grant based on a payload size of the grant, the common search space overlapping with the UE specific search space when a first control channel element (CCE) index of the common search space and the UE specific search space are the same.

6. The method of claim 5, wherein the grant is received in a physical downlink control channel (PDCCH).

7. The method of claim 5, wherein the grant schedules only said component carrier only when a cyclic redundancy check (CRC) appended to the grant is scrambled with a cell radio network temporary identifier (C-RNTI).

8. The method of claim 5, wherein the grant is one of an uplink (UL) grant scheduling the UE to transmit traffic data in a physical uplink shared channel (PUSCH) or a downlink (DL) grant scheduling the UE to receive traffic data in a physical downlink shared channel (PDSCH).

9. An apparatus for wireless communication, comprising:
    means for configuring a user equipment (UE) with a plurality of component carriers;
    means for determining when the UE would be unable to discern whether a carrier indicator field (CIF) is included in a grant transmitted on a component carrier of the plurality of component carriers; and
    means for scheduling, through the grant, only said component carrier when the inability to discern is determined, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the UE receiving the grant would be unable to discern whether the CIF is included in the grant based on a payload size of the grant, the common search space overlapping with the UE specific search space when a first control channel element (CCE) index of the common search space and the UE specific search space are the same.

10. The apparatus of claim 9, further comprising means for transmitting the grant in a physical downlink control channel (PDCCH) on said component carrier.

11. The apparatus of claim 9, wherein only said component carrier is scheduled only when a cyclic redundancy check (CRC) appended to the grant is scrambled with a cell radio network temporary identifier (C-RNTI).

12. The apparatus of claim 9, wherein the grant is one of an uplink (UL) grant scheduling the UE to transmit traffic data in a physical uplink shared channel (PUSCH) or a downlink (DL) grant scheduling the UE to receive traffic data in a physical downlink shared channel (PDSCH).

13. An apparatus for wireless communication, comprising:
means for receiving a grant on a component carrier of a plurality of component carriers; and
means for communicating with an eNodeB based on the grant,
wherein the grant schedules only said component carrier when the eNodeB determines that the apparatus would be unable to discern whether a carrier indicator field (CIF) is included in the grant, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the apparatus receiving the grant would be unable to discern whether the CIF is included in the grant based on a payload size of the grant, the common search space overlapping with the UE specific search space when a first control channel element (CCE) index of the common search space and the UE specific search space are the same.

14. The apparatus of claim 13, wherein the grant is received in a physical downlink control channel (PDCCH).

15. The apparatus of claim 13, wherein the grant schedules only said component carrier only when a cyclic redundancy check (CRC) appended to the grant is scrambled with a cell radio network temporary identifier (C-RNTI).

16. The apparatus of claim 13, wherein the grant is one of an uplink (UL) grant scheduling the apparatus to transmit traffic data in a physical uplink shared channel (PUSCH) or a downlink (DL) grant scheduling the apparatus to receive traffic data in a physical downlink shared channel (PDSCH).

17. A non-transitory computer-readable medium comprising code for:
configuring, via one or more processors, a user equipment (UE) with a plurality of component carriers;
determining, via the one or more processors, when the UE would be unable to discern whether a carrier indicator field (CIF) is included in a grant transmitted on a component carrier of the plurality of component carriers; and
scheduling, through the grant, via the one or more processors, only said component carrier when the inability to discern is determined, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the UE receiving the grant would be unable to discern whether the CIF is included in the grant based on a payload size of the grant, the common search space overlapping with the UE specific search space when a first control channel element (CCE) index of the common search space and the UE specific search space are the same.

18. A non-transitory computer-readable medium in a user equipment (UE), the non-transitory computer-readable medium comprising code for:
receiving, via one or more processors, a grant on a component carrier of a plurality of component carriers; and
communicating, via the one or more processors, with an eNodeB based on the grant,
wherein the grant schedules only said component carrier when the eNodeB determines that the UE would be unable to discern whether a carrier indicator field (CIF) is included in the grant, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the UE receiving the grant would be unable to discern whether the CIF is included in the grant based on a payload size of the grant, the common search space overlapping with the UE specific search space when a first control channel element (CCE) index of the common search space and the UE specific search space are the same.

19. An apparatus for wireless communication, comprising:
at least one processor configured to:
configure a user equipment (UE) with a plurality of component carriers;
determine when the UE would be unable to discern whether a carrier indicator field (CIF) is included in a grant transmitted on a component carrier of the plurality of component carriers; and
schedule, through the grant, only said component carrier when the inability to discern is determined, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the UE receiving the grant would be unable to discern whether the CIF is included in the grant based on a payload size of the grant, the common search space overlapping with the UE specific search space when a first control channel element (CCE) index of the common search space and the UE specific search space are the same; and memory coupled to the at least one processor.

20. An apparatus for wireless communication, comprising:
at least one processor configured to:
receive a grant on a component carrier of a plurality of component carriers; and
communicate with an eNodeB based on the grant,
wherein the grant schedules only said component carrier when the eNodeB determines that the apparatus would be unable to discern whether a carrier indicator field (CIF) is included in the grant, wherein said component carrier is a primary component carrier, the plurality of component carriers includes the primary component carrier and at least one secondary component carrier, and the CIF indicates one component carrier of the plurality of component carriers to which the grant applies, and wherein the inability to discern is determined when the grant is located in an overlapping search space of a common search space and a UE specific search space and the apparatus receiving the grant would be unable to discern whether the CIF is included in the grant based on a payload size of the grant, the common search space overlapping with the UE specific search space when a first control channel element (CCE) index of the common search space and the UE specific search space are the same; and
memory coupled to the at least one processor.

21. A method of operating a user equipment (UE), comprising:
monitoring, via one or more processors, for a physical downlink control channel (PDCCH) in a common search space and a UE-specific search space for a cell of a plurality of serving cells; and
when the UE is unable to discern whether a carrier indicator field (CIF) is included in the PDCCH, assuming, via the one or more processors, information received in the PDCCH in the common search space is for the cell, wherein:
the UE is unable to discern whether the CIF is included when the received information includes a cyclic redundancy check (CRC) scrambled with a cell radio network temporary identifier (C-RNTI), has a common payload size, and is located in an overlapping search space of the common search space and the UE specific search space;
the common search space is overlapping with the UE specific search space when a first control channel element (CCE) index of the common search space and the UE specific search space are the same; and
the cell comprises a primary cell that is different from another serving cell of the UE, and wherein the common payload size is an equal payload size whether the received information is assumed to be for the other serving cell or the primary cell.

22. An apparatus for wireless communication, comprising:
means for monitoring a physical downlink control channel (PDCCH) in a common search space and a user equipment (UE) specific search space for a cell of a plurality of serving cells; and
when the UE is unable to discern whether a carrier indicator field (CIF) is included in PDCCH, means for assuming information received in the PDCCH in the common search space is for the cell, wherein:
the UE is unable to discern whether the CIF is included when the received information includes a cyclic redundancy check (CRC) scrambled with a cell radio network temporary identifier (C-RNTI), has a common payload size, and is located in an overlapping search space of the common search space and the UE specific search space;
the common search space is overlapping with the UE specific search space when a first control channel element (CCE) index of the common search space and the UE specific search space are the same; and
the cell comprises a primary cell that is different from another serving cell of the UE, and wherein the common payload size is an equal payload size whether the received information is assumed to be for the other serving cell or the primary cell.

23. A non-transitory computer-readable medium in a user equipment (UE), the non-transitory computer-readable medium comprising code for:
monitoring, via one or more processors, a physical downlink control channel (PDCCH) in a common search space and a UE-specific search space for a cell of a plurality of serving cells; and
when the UE is unable to discern whether a carrier indicator field (CIF) is included in PDCCH, assuming, via the one or more processors, information received in the PDCCH in the common search space is for the cell, wherein:
the UE is unable to discern whether the CIF is included when the received information includes a cyclic redundancy check (CRC) scrambled with a cell radio network temporary identifier (C-RNTI), has a common payload size, and is located in an overlapping search space of the common search space and the UE specific search space;
the common search space is overlapping with the UE specific search space when a first control channel element (CCE) index of the common search space and the UE specific search space are the same; and
the cell comprises a primary cell that is different from another serving cell of the UE, and wherein the common payload size is an equal payload size whether the received information is assumed to be for the other serving cell or the primary cell.

24. An apparatus for wireless communication, comprising:
at least one processor configured to:
monitor a physical downlink control channel (PDCCH) in a common search space and a user equipment (UE) specific search space for a cell of a plurality of serving cells; and
when the UE is unable to discern whether a carrier indicator field (CIF) is included in PDCCH, assume information received in the PDCCH in the common search space is for the cell, wherein:
the UE is unable to discern whether the CIF is included when the received information includes a cyclic redundancy check (CRC) scrambled with a cell radio network temporary identifier (C-RNTI), has a common payload size, and is located in an overlapping search space of the common search space and the UE specific search space;
the common search space is overlapping with the UE specific search space when a first control channel element (CCE) index of the common search space and the UE specific search space are the same; and the cell comprises a primary cell that is different from another serving cell of the UE, and wherein the common payload size is an equal payload size whether the received information is assumed to be for the other serving cell or the primary cell; and memory coupled to the at least one processor.

* * * * *